(12) United States Patent
Park et al.

(10) Patent No.: US 9,860,545 B2
(45) Date of Patent: Jan. 2, 2018

(54) METHOD AND APPARATUS FOR MULTI-VIEW VIDEO ENCODING AND METHOD AND APPARATUS FOR MULTIVIEW VIDEO DECODING

(75) Inventors: Gwang-Hoon Park, Seongnam-si (KR); Kyu-Heon Kim, Seoul (KR); Min-Woo Park, Suwon-si (KR); Doug-Young Suh, Seongnam-si (KR); Jong-Tae Park, Bucheon-si (KR); Gwang-Hoon Park, legal representative, Seongnam-si (KR)

(73) Assignees: SAMSUNG ELECTRONICS CO., LTD., Suwon-si (KR); Industry Academic Cooperation Foundation Kyunghee University, Seoul (KR)

( * ) Notice: Subject to any disclaimer, the term of this patent is extended or adjusted under 35 U.S.C. 154(b) by 1376 days.

(21) Appl. No.: 12/811,939

(22) PCT Filed: Jan. 6, 2009

(86) PCT No.: PCT/KR2009/000036
§ 371 (c)(1),
(2), (4) Date: Sep. 24, 2010

(87) PCT Pub. No.: WO2009/088196
PCT Pub. Date: Jul. 16, 2009

(65) Prior Publication Data
US 2011/0002392 A1 Jan. 6, 2011

Related U.S. Application Data

(60) Provisional application No. 61/046,080, filed on Apr. 18, 2008.

(30) Foreign Application Priority Data

Jan. 7, 2008 (KR) .................. 10-2008-0001948
Sep. 4, 2008 (KR) .................. 10-2008-0087435

(51) Int. Cl.
*H04N 7/12* (2006.01)
*H04N 19/44* (2014.01)
(Continued)

(52) U.S. Cl.
CPC .......... *H04N 19/44* (2014.11); *H04N 19/597* (2014.11); *H04N 19/70* (2014.11)

(58) Field of Classification Search
CPC ....... H04N 19/00769; H04N 19/00278; H04N 19/00781; H04N 13/0003; H04N 13/004;
(Continued)

(56) References Cited

U.S. PATENT DOCUMENTS 8,295,347 B2 * 10/2012 Fuchie ............. H04N 21/23406
375/240.07
8,855,200 B2 * 10/2014 Koo ..................... H04N 19/597
375/240.12
(Continued)

FOREIGN PATENT DOCUMENTS

KR 1020050041293 A 5/2005
KR 1020070108092 A 11/2007
(Continued)

OTHER PUBLICATIONS

Communication dated Aug. 31, 2015, issued by the Korean Intellectual Property Office in counterpart Korean Application No. 10-2008-0087435.
(Continued)

*Primary Examiner* — Jessica M Prince
(74) *Attorney, Agent, or Firm* — Sughrue Mion, PLLC

(57) ABSTRACT

Methods and apparatuses for efficiently coding and decoding multi-view video are provided. A method of decoding multi-view video includes: interpreting from a received bitstream a block type indicating a method of determining a motion vector of a current block present in a current picture of the
(Continued)

multi-view video; interpreting a first picture type indicating whether the current picture is a reference picture type for inter prediction; interpreting additional information of the current picture based on at least one of the interpreted first picture type and the interpreted block type; and reconstructing the current block and the current picture by using the additional information.

7 Claims, 22 Drawing Sheets

(51) Int. Cl.
*H04N 19/597* (2014.01)
*H04N 19/70* (2014.01)

(58) Field of Classification Search
CPC ........... H04N 13/0051; H04N 13/0055; H04N 13/0059; H04N 13/0066; H04N 13/0239; H04N 13/0285; H04N 13/0404; H04N 13/0438
USPC .................................................. 375/240.16
See application file for complete search history.

(56) References Cited

U.S. PATENT DOCUMENTS

| | | |
|---|---|---|
| 9,161,050 B2 | 10/2015 | Kondo et al. |
| 2004/0120396 A1 | 6/2004 | Yun et al. |
| 2005/0094727 A1 | 5/2005 | Ha et al. |
| 2006/0146143 A1 | 7/2006 | Xin et al. |
| 2006/0232666 A1 | 10/2006 | Op De Beeck et al. |
| 2007/0064799 A1* | 3/2007 | Ha ........................ H04N 19/597 375/240.12 |
| 2007/0109409 A1 | 5/2007 | Yea et al. |
| 2008/0144714 A1* | 6/2008 | Etoh .................... H04N 9/8042 375/240.03 |
| 2008/0285654 A1* | 11/2008 | Cai ....................... H04N 19/597 375/240.16 |
| 2010/0091858 A1* | 4/2010 | Yang .................... H04N 19/176 375/240.13 |
| 2010/0266042 A1* | 10/2010 | Koo ..................... H04N 19/597 375/240.16 |

FOREIGN PATENT DOCUMENTS

| | | |
|---|---|---|
| KR | 1020070111969 A | 11/2007 |
| KR | 1020080002952 A | 1/2008 |
| WO | 2007129840 A1 | 11/2007 |

OTHER PUBLICATIONS

Communication dated Jul. 14, 2009, issued by the International Searching Authority in counterpart International Application No. PCT/KR2009/000035 (PCT/ISA/237 & PCT/ISA/210 ).
Communication dated Jul. 13, 2010, issued by the International Searching Authority in counterpart International Application No. PCT/KR2009/000035 (PCT/IB/373).
Communication dated Feb. 9, 2015 by the Korean Intellectual Property Office in related application No. 1020080087435.

* cited by examiner

FIG. 6A

| slice_data( ) { | C | Descriptor |
|---|---|---|
| if( entropy_coding_mode_flag ) | | |
|   while( !byte_aligned( ) ) | | |
|     cabac_alignment_one_bit | 2 | f(1) |
| CurrMbAddr = first_mb_in_slice * ( 1 + MbaffFrameFlag ) | | |
| moreDataFlag = 1 | | |
| prevMbSkipped = 0 | | |
| do { | | |
|   if( slice_type != I && slice_type != SI ) | | |
|     if( !entropy_coding_mode_flag ) { | | |
| 610 —      mb_skip_run | 2 | ue(v) |
|       prevMbSkipped = ( mb_skip_run > 0 ) | | |
|       for( i=0; i<mb_skip_run; i++ ) { | | |
|         if( anchor_pic_flag ) { | | |
|           anchor_enhancement_information() —620 | 2 | |
|         } | | |
|         CurrMbAddr = NextMbAddress( CurrMbAddr ) | | |
|       } | | |
|       moreDataFlag = more_rbsp_data( ) | | |
|     } else { | | |
| 630 —      mb_skip_flag | 2 | ae(v) |
|       if( mb_skip_flag && anchor_pic_flag ) { | | |
|         anchor_enhancement_information() —640 | 2 | |
|       } | | |
|       moreDataFlag = !mb_skip_flag | | |
|     } | | |

| | | |
|---|---|---|
| if( moreDataFlag ) { | | |
|     if( MbaffFrameFlag && ( CurrMbAddr % 2  = =  0  \|\|<br>    ( CurrMbAddr % 2  = =  1  &&  prevMbSkipped ) ) ) | | |
|         mb_field_decoding_flag | 2 | u(1) \| ae(v) |
|         macroblock_layer( ) | 2 \| 3 \| 4 | |
|     } | | |
|     if( !entropy_coding_mode_flag ) | | |
|         moreDataFlag = more_rbsp_data( ) | | |
|     else { | | |
|         if( slice_type != I  &&  slice_type  != SI ) | | |
|         prevMbSkipped = mb_skip_flag | | |
|         if( MbaffFrameFlag  &&  CurrMbAddr % 2  = =  0 ) | | |
|         moreDataFlag = 1 | | |
|         else { | | |
|             end_of_slice_flag | 2 | ae(v) |
|             moreDataFlag = !end_of_slice_flag | | |
|         } | | |

| | | |
|---|---|---|
|     } | | |
|     CurrMbAddr = NextMbAddress( CurrMbAddr ) | | |
| } while( moreDataFlag ) | | |
| } | | |

FIG. 8

| slice_data( ) { | C | Descriptor |
|---|---|---|
| if( entropy_coding_mode_flag ) | | |
| while( !byte_aligned( ) ) | | |
| cabac_alignment_one_bit | 2 | f(1) |
| CurrMbAddr = first_mb_in_slice * ( 1 + MbaffFrameFlag ) | | |
| moreDataFlag = 1 | | |
| prevMbSkipped = 0 | | |
| do { | | |
| if( slice_type != I && slice_type != SI ) | | |
| if( !entropy_coding_mode_flag ) { | | |
| mb_skip_run ——810 | 2 | ue(v) |
| prevMbSkipped = ( mb_skip_run > 0 ) | | |
| for( i=0; i<mb_skip_run; i++ ) { | | |
| if( anchor_pic_flag && slice_type == P) { | | |
| anchor_enhancement_information() —820 | 2 | |
| } | | |
| CurrMbAddr = NextMbAddress( CurrMbAddr ) | | |
| } | | |
| moreDataFlag = more_rbsp_data( ) | | |
| } else { | | |
| 830——mb_skip_flag | 2 | ae(v) |
| if( mb_skip_flag && anchor_pic_flag && slice_type == P) { | | |
| anchor_enhancement_information() —840 | 2 | |
| } | | |
| moreDataFlag = !mb_skip_flag | | |
| } | | |

| slice_header( ) { | C | Descriptor |
|---|---|---|
| first_mb_in_slice | 2 | ue(v) |
| slice_type | 2 | ue(v) |
| ... | | |
| if( anchor_pic_flag) | | |
|    use_anchor_enh_inform_flag —— 1010 | 2 | u(1) |
| ... | | |
| } | | |

| slice_data( ) { | C | Descriptor |
|---|---|---|
| if( entropy_coding_mode_flag ) | | |
|   while( !byte_aligned( ) ) | | |
|     cabac_alignment_one_bit | 2 | f(1) |
| CurrMbAddr = first_mb_in_slice * ( 1 + MbaffFrameFlag ) | | |
| moreDataFlag = 1 | | |
| prevMbSkipped = 0 | | |
| do { | | |
|   if( slice_type != I && slice_type != SI ) | | |
|     if( !entropy_coding_mode_flag ) { | | |
|       mb_skip_run —— 1110 | 2 | ue(v) |
|       prevMbSkipped = ( mb_skip_run > 0 ) | | |
|       for( i=0; i<mb_skip_run; i++ ) { | | |
|         if( use_anchor_enh_inform_flag ) { | | |
|           anchor_enhancement_information() —— 1120 | 2 | |
|         } | | |
|         CurrMbAddr = NextMbAddress( CurrMbAddr ) | | |
|       } | | |
|       moreDataFlag = more_rbsp_data( ) | | |
|     } else { | | |
| 1130 ——       mb_skip_flag | 2 | ae(v) |
|       if( mb_skip_flag && use_anchor_enh_inform_flag ) { | | |
|         anchor_enhancement_information() —— 1140 | 2 | |
|       } | | |
|       moreDataFlag = !mb_skip_flag | | |
|     } | | |

FIG. 13
| anchor_enhancement_information ( ) { | C | Descriptor |
|---|---|---|
| cb_offset —1310 | 2 | se(v) \| ae(v) |
| cr_offset —1320 | 2 | se(v) \| ae(v) |
| } | | |
1300
FIG. 14A
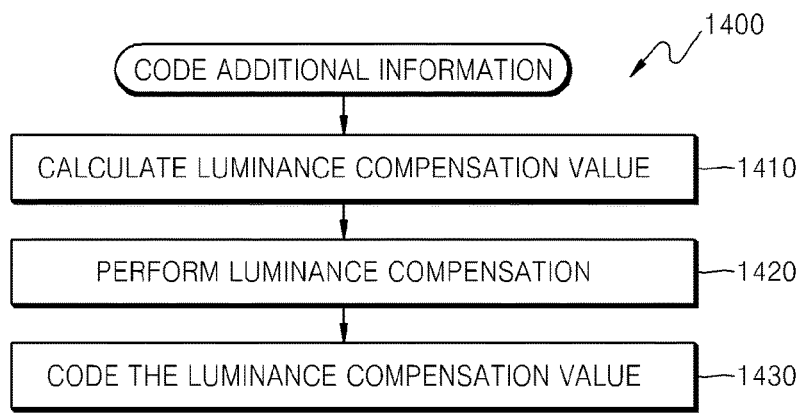
FIG. 14B
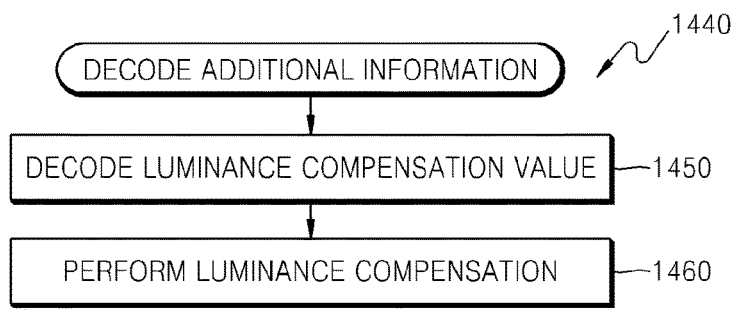

| anchor_enhancement_information ( ) { | C | Descriptor |
|---|---|---|
| if( slice_type == P \|\| slice_type == B ) { | | |
| for( compIdx = 0; compIdx < 2; compIdx++ ) | | |
| mvd_l0 [compIdx] —1810 | 2 | se(v) \| ae(v) |
| } | | |
| if( slice_type == B ) { | | |
| for( compIdx = 0; compIdx < 2; compIdx++) | | |
| mvd_l1 [compIdx] —1820 | 2 | se(v) \| ae(v) |
| } | | |
| } | | |

| anchor_enhancement_information ( ) { | C | Descriptor |
|---|---|---|
| if( num_ref_idx_l0_active_minus1 > 0 && (slice_type == P \|\| slice_type == B ) ) | | |
| ref_idx_l0 —1840 | 2 | te(v) \| ae(v) |
| if( num_ref_idx_l1_active_minus1 > 0 && (slice_type == B ) ) | | |
| ref_idx_l1 —1850 | 2 | te(v) \| ae(v) |
| if( slice_type == P \|\| slice_type == B ) { | | |
| for( compIdx = 0; compIdx < 2; compIdx++ ) | | |
| mvd_l0 [compIdx] —1860 | 2 | se(v) \| ae(v) |
| } | | |
| if( slice_type == B ) { | | |
| for( compIdx = 0; compIdx < 2; compIdx++) | | |
| mvd_l1 [compIdx] —1870 | 2 | se(v) \| ae(v) |
| } | | |
| } | | |

FIG. 20A

| anchor_enhancement_information ( ) { | C | Descriptor |
|---|---|---|
|    use_predictor_as_mv_flag —— 2010 | 2 | u(1) \| ae(v) |
|    if( !use_predictor_as_mv_flag ) { | | |
|      if( slice_type == P \|\| slice type == B ) { | | |
|        for( compIdx = 0; compIdx < 2; compIdx++ ) | | |
|          mvd_l0 [compIdx] —— 2020 | 2 | se(v) \| ae(v) |
|      } | | |
|      if( slice_type == B ) { | | |
|        for( compIdx = 0; compIdx < 2; compIdx++) | | |
|          mvd_l1 [compIdx] —— 2030 | 2 | se(v) \| ae(v) |
|      } | | |
|    } | | |
| } | | |

| anchor_enhancement_information ( ) { | C | Descriptor |
|---|---|---|
|    use_predictor_as_mv_flag —2050 | 2 | u(1) \| ae(v) |
|    if( !use_predictor_as_mv_flag ) { | | |
|      if( num_ref_idx_l0_active_minus1 > 0 && (slice_type == P \|\| slice_type == B) ) | | |
|        ref_idx_l0 —2060 | 2 | te(v) \| ae(v) |
|      if( num_ref_idx_l1_active_minus1 > 0 && (slice_type == B) ) | | |
|        ref_idx_l1 —2070 | 2 | te(v) \| ae(v) |
|      if( slice_type == P \|\| slice_type == B ) { | | |
|        for( compIdx = 0; compIdx < 2; compIdx++ ) | | |
|          mvd_l0 [compIdx] —2080 | 2 | se(v) \| ae(v) |
|      } | | |
|      if( slice_type == B ) { | | |
|        for( compIdx = 0; compIdx < 2; compIdx++) | | |
|          mvd_l1 [compIdx] —2090 | 2 | se(v) \| ae(v) |
|      } | | |
|    } | | |
| } | | |

2040

METHOD AND APPARATUS FOR MULTI-VIEW VIDEO ENCODING AND METHOD AND APPARATUS FOR MULTIVIEW VIDEO DECODING

CROSS REFERENCE TO RELATED APPLICATION

This application is a National Stage application under 35 U.S.C. §371 of PCT/KR2009/000036 filed on Jan. 6, 2009, which claims priority from Korean Patent Application No. 10-2008-0001948, filed on Jan. 7, 2008 in the Korean Intellectual Property Office, and Korean Patent Application No. 10-2008-0087435, filed on Sep. 4, 2008 in the Korean Intellectual Property Office, and which claims the benefit of U.S. Provisional Patent Application No. 61/046,080, filed on Apr. 18, 2008, all the disclosures of which are incorporated herein in their entireties by reference.

BACKGROUND

Field

Apparatuses and methods consistent with exemplary embodiments relate to a method and apparatus for efficiently coding or decoding multi-view video.

Description of the Related Art

In a related art field of multi-view video coding, research has been conducted to improve coding performance based on Moving Picture Experts Group (MPEG)-4 part 10 advanced video coding (AVC)/H.264 standards, which are the existing international video standards. Hierarchical B-pictures coding, which supports temporal scalability by joint scalable video coding (JSVC), is performed along a time axis and inter-view prediction is performed to improve coding performance.

SUMMARY

Aspects of exemplary embodiments provide a method and apparatus for efficiently coding or decoding multi-view video.

According to an aspect of an exemplary embodiment, there is provided a method of coding multi-view video, the method including: determining a block type indicating a method of determining a motion vector of a current block present in a current picture; determining a first picture type indicating whether the current picture is a reference picture type for inter prediction; determining additional information of the current picture based on at least one of the determined first picture type and the determined block type; and coding the determined additional information of the current picture.

The additional information of the current picture may include information regarding at least one of chrominance, luminance and motion compensation on each of blocks of a predetermined block type of the current picture.

The determining of the block type may include determining whether the current block is a skip mode block and setting information regarding the block type of the current block accordingly.

The determining of the first picture type may include determining whether the current picture is a reference picture for inter predicting another picture from a same viewpoint as the current picture and for inter-view predicting another picture from a different viewpoint as the current picture, and setting information regarding the first picture type accordingly.

During the determining of the additional information, the additional information may be determined when the current block is the skip mode block type and the first picture type of the current picture is a reference picture for inter predicting another picture from the same viewpoint as the current picture and for inter-view predicting another picture from a different viewpoint as the current picture.

The method may further include determining a second picture type of the current picture and setting information regarding the second picture type.

The determining of the additional information may include determining the additional information of the current picture based on the determined block type of the current block and the determined first and second picture types of the current picture.

The second picture type may include at least one of an intra-coded (I) picture type, a predictive-coded (P) picture type, and bi-directional (B) picture type.

The method may further include determining additional information coding information indicating whether to code the additional information.

The determining of the additional information may include determining the additional information of the current picture based on the block type of the current block, the first picture type of the current picture, and the additional information coding information.

The determining of the additional information coding information may include: calculating averages of values of respective Y components, U components, and V components of pixels of the current picture; calculating averages of values of respective Y components, U components, and V components of pixels of a reference picture of the current picture; calculating an absolute value of a difference between the averages of the values of the Y components of the current picture and the values of the Y components of the reference picture; calculating an absolute value of a difference between the averages of the values of the U components of the current picture and the values of the U components of the reference picture; calculating an absolute value of the difference between the averages of the values of the V components of the current picture and the values of the V components of the reference picture; calculating a sum of the absolute values; and determining that the additional information is to be coded when the sum of the absolute values is greater than a predetermined threshold.

The determining of the additional information coding information may include calculating a chrominance compensation value between the current block and a corresponding block of the reference picture.

The determining of the additional information coding information may further include performing chrominance compensation on the current block by using the calculated chrominance compensation value.

The determining of the additional information coding information may include calculating the chrominance compensation value of each of the U and V components and performing chrominance compensation according to the calculated chrominance compensation values.

Chrominance compensation may be performed simultaneously with performing motion compensation on the current block.

In the coding of the additional information, the additional information may include the chrominance compensation value of the current block.

In the coding of the additional information, the additional information may include a difference between the chrominance compensation value of the current block and a predicted chrominance compensation value, and the predicted chrominance compensation value may be based on a chrominance compensation value of a neighboring block of the current block.

The determining of the additional information may include calculating a luminance compensation value between the current block and the corresponding block.

The determining of the additional information may further include performing luminance compensation on the current block by using the calculated luminance compensation value.

Luminance compensation may be performed simultaneously with performing motion compensation on the current block.

In the coding of the additional information, the additional information may include a luminance compensation value of the current block.

In the coding of the additional information, the additional information may include a difference between the luminance compensation value of the current block and a predicted value of the luminance compensation value, and the predicted value may be based on a luminance compensation value of a neighboring block of the current block.

In the determining of the additional information, a motion vector of a neighboring block of the current block may be determined as a motion vector of the current block.

In the determining of the motion vector, the motion vector of the neighboring block may be a motion vector between the neighboring block, and a corresponding block among blocks present in a previous reference picture closest to the current picture from among reference pictures of the current picture, which is a reference block of the neighboring block.

In the determining of the motion vector, the neighboring block may not be a skip mode block.

The determining of the additional information may further include performing motion compensation on the current block by using the motion vector.

The coding of the additional information may include setting a reference index of the current block in order to determine a motion vector of a neighboring block of the current block as the motion vector of the current block.

The determining of the additional information may include performing motion estimation on the current block, and determining a motion vector of the current block according to a result of the performing the motion estimation.

The determining of the additional information may further include determining a previous reference picture closest to the current picture from among reference pictures of the current picture, as a reference picture for determining the motion vector of the current block when the current block is in a P skip mode.

The determining of the additional information may further include selecting two pictures from previous and subsequent reference pictures nearest to the current picture from among reference pictures of the current picture, as reference pictures for determining the motion vector of the current block when the current block is in a B skip mode.

The determining of the additional information may further include performing motion compensation on the current block by using the motion vector.

In the coding of the additional information, the additional information may include the motion vector of the current block.

In the coding of the additional information, the additional information may include a difference between the motion vector of the current block and a predicted value of the motion vector, and the predicted value may be based on a motion vector of a neighboring block of the current block.

In the coding of the additional information, the additional information may include a reference picture for determining the motion vector of the current block.

In the coding of the additional information, the additional information may be coded based on motion vector coding information indicating whether the motion vector of the current block is to be coded, and may include the motion vector coding information.

If the motion vector of the current block is identical to the predicted value of the motion vector, the motion vector coding information may be set to indicate that the motion vector is not to be coded.

If the motion vector of the current block is different from the predicted value thereof, the motion vector coding information may be set to indicate that the motion vector is to be coded.

The predicted value of the motion vector may be based on a motion vector of a neighboring block of the current block.

Reference pictures of the current picture may be captured from viewpoints which are different from a viewpoint of the current picture on the same point of time, and each of reference pictures captured from a plurality of viewpoints may be a reference picture for inter predicting another picture from the same viewpoint on a different point of time.

According to an aspect of another exemplary embodiment, there is provided a method of decoding multi-view video, the method including: interpreting a block type indicating a method of determining a motion vector of a current block present in a current picture; interpreting a first picture type indicating whether the current picture is a reference picture type for inter prediction; interpreting additional information of the current picture based on at least one of the interpreted first picture type and the interpreted block type; and reconstructing the current block and the current picture by using the interpreted additional information.

The interpreting of the block type may include: interpreting information regarding the block type of the current block; and determining whether the current block is a skip mode block based on the interpreting result.

The interpreting of the first picture type may include: interpreting information regarding the first picture type of the current picture; and determining whether the current picture is a reference picture used for inter predicting another picture from the same viewpoint and for inter-view predicting another picture from a different viewpoint, based on the information regarding the first picture type.

If the current block is a skip mode block type and the first picture type of the current picture is a reference picture used for inter predicting another picture from the same viewpoint and for inter-view predicting another picture from a different viewpoint, the interpreting of the additional information may include interpreting the additional information of the current picture.

The method may further include interpreting information regarding a second picture type of the current picture, wherein the interpreting of the additional information may include interpreting the additional information based on the block type, the first picture type, and the second picture type, and the second picture type may include at least one of an I picture type, a P picture type and a B picture type.

The method may further include additional information coding information indicating whether to code the additional information of the current picture, wherein the interpreting of the additional information may include interpreting the additional information based on the block type, the first picture type, and the additional information coding information.

If a value of the additional information coding information is greater than a predetermined threshold, the interpreting of the additional information may include interpreting the additional information based on the block type and the first picture type.

The interpreting of the additional information may include interpreting a chrominance compensation value between the current block and a corresponding block which is a reference block of the current block.

The interpreting of the additional information may include: interpreting the chrominance compensation difference with respect to a chrominance compensation value between the current block and a corresponding block which is a reference block of the current block; and calculating the chrominance compensation value of the current block by combining a predicted chrominance compensation value, which is based on a chrominance compensation value of a neighboring block of the current block, with the chrominance compensation difference.

The reconstructing of the current block and the current picture may include: performing chrominance compensation on the current block by using the chrominance compensation value of the current block; and reconstructing the current block and the current picture according to a result of the performing the chrominance compensation.

The chrominance compensation may be performed simultaneously with performing motion compensation on the current block.

The interpreting of the chrominance compensation value may include interpreting the chrominance compensation value of each of a U component and a V component, and chrominance compensation may be performed separately on the U and V components.

The interpreting of the additional information may include a luminance compensation value between the current block and a corresponding block which is a reference block of the current block.

The interpreting of the luminance compensation value may include: interpreting the luminance compensation difference with respect to a luminance compensation value between the current block and the corresponding block; and calculating the luminance compensation value of the current block by combining a predicted luminance compensation value, which is based on a luminance compensation value of a neighboring block of the current block, with the luminance compensation difference.

The reconstructing of the current block and the current picture may include: performing luminance compensation on the current block by using the luminance compensation value of the current block; and reconstructing the current block and the current picture according to a result of the performing of the luminance compensation.

The luminance compensation may be performed simultaneously with the performing of the motion compensation on the current block.

The interpreting of the additional information may include determining a motion vector of a neighboring block of the current block as the motion vector of the current block by interpreting a reference index of the current block.

The determining of the motion vector may include determining a motion vector between the neighboring block and a corresponding block as the motion vector of the neighboring block, wherein the corresponding block is a reference block of the neighboring block and is selected from among blocks of a previous reference picture closest to the current picture from among reference pictures of the current picture.

The neighboring block may not be a skip mode block.

The reconstructing of the current block and the current picture may include: performing motion compensation on the current block by using the motion vector; and reconstructing the current block and the current picture according to a result of the performing the motion compensation.

The interpreting of the additional information may include interpreting the motion vector of the current block.

The interpreting of the additional information may include: interpreting a motion vector difference with respect to the motion vector of the current block; and calculating the motion vector of the current block by combining a predicted motion vector, which is based on a motion vector of a neighboring block of the current block, with the motion vector difference.

The interpreting of the additional information may further include interpreting a reference picture for the motion vector of the current block.

The interpreting of the motion vector may include: interpreting motion vector coding information indicating whether to code motion vectors of blocks of the current block; determining whether to interpret the motion vectors, based on the motion vector coding information; and interpreting the motion vectors according to a result of the determining of whether to interpret the motion vectors.

If it is determined that the motion vector is not to be coded based on the motion vector coding information, the interpreting of the motion vector may include determining a predicted motion vector which is based on the motion vector of the neighboring block as the motion vector of the current block, and if it is determined that the motion vector is to be coded based on the motion vector coding information, the motion vector may be interpreted using the additional information.

The reconstructing of the current block and the current picture may include: performing motion compensation on the current block by using the motion vector; and reconstructing the current block and the current picture according to a result of the performing the motion compensation.

If the current block is a P skip mode block, the performing of the motion compensation may include: determining a previous reference picture closest to the current picture from among reference pictures of the current picture, as a reference picture for the motion vector of the current block; and performing the motion compensation on the current block by using the reference picture and the motion vector.

If the current block is in a B skip mode, the performing of the motion compensation may include: selecting two reference pictures from among previous and subsequent reference pictures nearest to the current picture from among reference pictures of the current picture, as reference pictures for the motion vector of the current block; and performing motion compensation on the current block by using the reference pictures and the motion vector.

Reference pictures of the current picture may be captured from different viewpoints along a same time axis, and each of reference pictures captured from a plurality of viewpoints may be used as a reference picture for inter predicting another picture from the same viewpoint.

According to an aspect of another exemplary embodiment, there is provided an apparatus for coding multi-view video, the apparatus including: a block type determination unit which determines a block type indicating a method of determining a motion vector of a current block present in a current picture; a first picture type determination unit which determines a first picture type indicating whether the current picture is a reference picture type for inter prediction; an additional information determination unit which determines additional information of the current picture based on at least one of the determined first picture type and the determined block type; and a coding unit which codes the additional information of the current picture.

The block type determination unit may determine whether the current block is a skip mode block and set information regarding the block type of the current block accordingly.

The first picture type determination unit may determine whether the current picture is a reference picture for inter predicting another picture from a same viewpoint as the current picture and for inter-view predicting another picture from a different viewpoint as the current picture, and may set information regarding the first picture type accordingly.

The additional information determination unit may determine the additional information when the current block is the skip mode block type and the first picture type of the current picture is a reference picture for inter predicting another picture from the same viewpoint and for inter-view predicting another picture from a different viewpoint.

The apparatus may further include a second picture type determination unit which determines a second picture type of the current picture and sets information regarding the second picture type.

The additional information determination unit may determine the additional information of the current picture based on the block type of the current block and the first and second picture types of the current picture.

The second picture type may include at least one of an I picture type, a P picture type, and a B picture type.

The apparatus may further include an additional information coding information determination unit which determines additional information coding information indicating whether to code the additional information.

The additional information determination unit may determine the additional information of the current picture based on the block type of the current block, the first picture type of the current picture, and the additional information coding information.

The additional information coding information determination unit may calculate averages of values of respective Y components, U components, and V components of pixels of the current picture, calculate averages of values of respective Y components, U components, and V components of pixels of a reference picture of the current picture, calculate an absolute value of a difference between the averages of the values of the Y components of the current picture and the values of the Y components of the reference picture, calculate an absolute value of a difference between the averages of the values of the U components of the current picture and the values of the U components of the reference picture; calculate an absolute value of a difference between the averages of the values of the V components of the current picture and the values of the V components of the reference picture; calculate a sum of the absolute values, and determine that the additional information is to be coded when the sum of the absolute values is greater than a predetermined threshold.

The additional information determination unit may include a chrominance information determination unit which calculates a chrominance compensation value between the current block and a corresponding block of the reference picture corresponding to the current block.

The additional information determination unit may further include a chrominance compensation performing unit which performs chrominance compensation on the current block by using the chrominance compensation value.

The additional information determination unit may calculate the chrominance compensation value of each of the U and V components and perform chrominance compensation accordingly.

The chrominance compensation performing unit may perform chrominance compensation simultaneously with performing motion compensation on the current block.

The additional information may include the chrominance compensation value of the current block.

The additional information may include a difference between the chrominance compensation value of the current block and a predicted chrominance compensation value.

The predicted value may be based on a chrominance compensation value of a neighboring block of the current block.

The additional information determination unit may include a luminance information determination unit which calculates a luminance compensation value between the current block and the corresponding block which is a reference block of the current block.

The additional information determination unit may further include a luminance compensation performing unit which performs luminance compensation on the current block by using the luminance compensation value.

The luminance compensation performing unit may perform the luminance compensation simultaneously with performing motion compensation on the current block.

The additional information may include a luminance compensation value of the current block.

The additional information coding unit may code as the additional information a difference between the luminance compensation value of the current block and a predicted value thereof.

The predicted value of the luminance compensation value may be based on a luminance compensation value of a neighboring block of the current block.

The additional information determination unit may include a motion vector determination unit which determines a motion vector of a neighboring block of the current block as a motion vector of the current block.

The motion vector of the neighboring block may be a motion vector between the neighboring block and a corresponding block of blocks present in a previous reference picture closest to the current picture from among reference pictures of the current picture, which is a reference block of the neighboring block.

The neighboring block may not be a skip mode block.

The additional information determination unit may further include a motion compensation performing unit which performs motion compensation on the current block by using the motion vector.

The additional information coding unit may set a reference index of the current block in order to determine a motion vector of a neighboring block of the current block as the motion vector of the current block.

The additional information determination unit may include a motion vector determination unit which performs motion estimation on the current block and determines a motion vector of the current block according to a result of the performing the motion estimation.

If the current block is in a P skip mode, the additional information determination unit may determine a previous reference picture closest to the current picture from among reference pictures of the current picture, as a reference picture for determining the motion vector of the current block.

If the current block is in a B skip mode, the additional information determination unit may select two pictures from among previous and subsequent reference pictures nearest to the current picture from among reference pictures of the current picture, as reference pictures for determining the motion vector of the current block.

The additional information determination unit may further include a motion compensation performing unit which performs motion compensation on the current block by using the motion vector.

The additional information may include the motion vector of the current block.

The additional information may include a difference between the motion vector of the current block and a predicted value thereof, and the predicted value may be based on a motion vector of a neighboring block of the current block.

The additional information may include a reference picture for determining the motion vector of the current block.

The additional information coding unit may code the additional information based on motion vector coding information indicating whether the motion vector of the current block is to be coded.

The additional information may include the motion vector coding information.

If the motion vector of the current block is identical to the predicted value thereof, the motion vector coding information may be set to indicate that the motion vector is not to be coded.

If the motion vector of the current block is different from the predicted value thereof, the motion vector coding information may be set to indicate that the motion vector is to be coded.

The predicted value may be based on a motion vector of a neighboring block of the current block.

Reference pictures of the current picture may be captured from viewpoints which are different from a viewpoint of the current picture at a same point of time, and each of reference pictures captured from a plurality of viewpoints may be a reference picture for inter predicting another picture from the same viewpoint on a different point of time.

According to an aspect of another exemplary embodiment, there is provided an apparatus for decoding multi-view video, the apparatus including: a block type interpretation unit which interprets a block type indicating a method of determining a motion vector of a current block present in a current picture; a first picture type interpretation unit which interprets a first picture type indicating whether the current picture is a reference picture type for inter prediction; an additional information interpretation unit which interprets additional information of the current picture based on at least one of the first picture type and the block type; and a reconstruction unit which reconstructs the current block and the current picture by using the additional information.

The block type interpretation unit may interpret information regarding the block type of the current block, and determine whether the current block is a skip mode block based on the interpreting result.

The first picture type interpretation unit may interpret information regarding the first picture type of the current picture, and determine whether the current picture is a reference picture used for inter predicting another picture from a same viewpoint and for inter-view predicting another picture from a different viewpoint, based on the information regarding the first picture type.

If the current block is a skip mode block type and the first picture type of the current picture is a reference picture used for inter predicting another picture from the same viewpoint and for inter-view predicting another picture from a different viewpoint, the additional information interpretation unit may interpret the additional information of the current picture.

The apparatus may further include a second picture type interpretation unit which interprets information regarding a second picture type of the current picture.

The additional information interpretation unit may interpret the additional information based on the block type, the first picture type, and the second picture type.

The second picture type may include at least one of an I picture type, a P picture type and a B picture type.

The apparatus may further include an additional information coding information interpretation unit which interprets additional information coding information indicating whether to code the additional information of the current picture.

The additional information interpretation unit may interpret the additional information based on the block type, the first picture type, and the additional information coding information.

If a value of the additional information coding information is greater than a predetermined threshold, the additional information interpretation unit may interpret the additional information based on the block type and the first picture type.

The additional information interpretation unit may interpret a chrominance compensation value between the current block and a corresponding block which is a reference block of the current block.

The additional information interpretation unit may include a chrominance compensation interpretation unit which interprets the chrominance compensation difference with respect to a chrominance compensation value between the current block and a corresponding block which is a reference block of the current block, and which calculates the chrominance compensation value of the current block by combining a predicted chrominance compensation value, which is based on a chrominance compensation value of a neighboring block of the current block, with the chrominance compensation difference.

The reconstructing unit may include a chrominance compensation performing unit which performs chrominance compensation on the current block by using the chrominance compensation value of the current block, and which reconstructs the current block and the current picture according to a result of performing the chrominance compensation.

The chrominance compensation performing unit may perform chrominance compensation together with performing motion compensation on the current block.

The chrominance compensation interpretation unit may interpret the chrominance compensation value of each of a U component and a V component, and may perform chrominance compensation separately on the U and V components.

The additional information interpretation unit may include a luminance compensation value interpretation unit which interprets a luminance compensation value between the current block and a corresponding block which is a reference block of the current block.

The luminance compensation value interpretation unit may include a luminance compensation interpretation unit which interprets the luminance compensation difference with respect to a luminance compensation value between the current block and the corresponding block, and calculates the luminance compensation value of the current block by combining a predicted luminance compensation value, which is based on a luminance compensation value of a neighboring block of the current block, with the luminance compensation difference.

The reconstructing unit may include a luminance compensation unit which performs luminance compensation on the current block by using the luminance compensation value of the current block, and which reconstructs the current block and the current picture according to a result of the performing the luminance compensation.

The luminance compensation performing unit may perform the luminance compensation simultaneously with performing motion compensation on the current block.

The additional information interpretation unit may include a motion vector determination unit which determines a motion vector of a neighboring block of the current block as the motion vector of the current block by interpreting a reference index of the current block.

The motion vector determination unit may determine a motion vector between the neighboring block and a corresponding block as the motion vector of the neighboring block, where the corresponding block is a reference block of the neighboring block and is selected from blocks of a previous reference picture closest to the current picture from among reference pictures of the current picture.

The neighboring block may not be a skip mode block.

The reconstructing unit may include a motion compensation performing unit which performs motion compensation on the current block by using the motion vector and reconstructs the current block and the current picture according to a result of the performing the motion compensation.

The additional information interpretation unit may include a motion vector interpretation unit which interprets the motion vector of the current block.

The additional information interpretation unit may include a motion vector interpretation unit which interprets a motion vector difference with respect to the motion vector of the current block, and which calculates the motion vector of the current block by combining a predicted motion vector, which is based on a motion vector of a neighboring block of the current block, with the motion vector difference.

The additional information interpretation unit may further include a reference picture interpretation unit which interprets a reference picture for the motion vector of the current block.

The motion vector interpretation unit may further include a motion vector coding information interpretation unit which interprets motion vector coding information indicating whether to code motion vectors of blocks of the current block and which determines whether to interpret the motion vectors, based on the motion vector coding information, and may interpret the motion vectors according to a result of the determining of whether to interpret the motion vectors.

If it is determined that the motion vector is not to be coded based on the motion vector coding information, the motion vector interpretation unit may determine a predicted motion vector which is based on the motion vector of the neighboring block as the motion vector of the current block.

If it is determined that the motion vector is to be coded based on the motion vector coding information, the motion vector may be interpreted using the additional information.

The reconstructing unit may include a motion compensation performing unit which performs motion compensation on the current block by using the motion vector, and which reconstructs the current block and the current picture according to a result of the performing the motion compensation.

If the current block is a P skip mode block, the motion compensation performing unit may determine a previous reference picture closest to the current picture from among reference pictures of the current picture, as a reference picture for the motion vector of the current block, and may perform motion compensation on the current block by using the reference picture and the motion vector.

If the current block is in a B skip mode, the motion compensation performing unit may select two reference pictures from among previous and subsequent reference pictures nearest to the current picture from among reference pictures of the current picture, as reference pictures for the motion vector of the current block, and may perform motion compensation on the current block by using the reference pictures and the motion vector.

Reference pictures of the current picture may be captured from different viewpoints along a same time axis, and each of the reference pictures captured from a plurality of viewpoints may be used as a reference picture for inter predicting another picture from the same viewpoint.

According to an aspect of another exemplary embodiment, there is provided a computer readable recording medium having recorded thereon a computer program for executing a method of coding multi-view video, the method including: determining a block type indicating a method of determining a motion vector of a current block present in a current picture; determining a first picture type indicating whether the current picture is a reference picture type for inter prediction; determining additional information of the current picture based on at least one of the determined first picture type and the determined block type; and coding the additional information of the current picture.

According to an aspect of another exemplary embodiment, there is provided a computer readable recording medium having recorded thereon a computer program for executing a method of decoding multi-view video, the method including: interpreting a block type indicating a method of determining a motion vector of a current block present in a current picture; interpreting a first picture type indicating whether the current picture is a reference picture type for inter prediction; interpreting additional information of the current picture based on at least one of the interpreted first picture type and the interpreted block type; and reconstructing the current block and the current picture by using the interpreted additional information.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 6A illustrate a former part of syntax for coding/decoding multi-view video including additional information in consideration of a first picture type and a block type, according to an exemplary embodiment;

FIG. 6B illustrate a latter part of the syntax of FIG. 6A;

FIG. 8 illustrates a former part of syntax for coding or decoding multi-view video including additional information in consideration of a first picture type and a second picture type, according to an exemplary embodiment;

FIG. 10 is a flowchart illustrating syntax of additional information coding information according to an exemplary embodiment;

FIG. 11 illustrates a former part of syntax for coding or decoding multi-view video containing additional information in consideration of additional information coding information, according to an exemplary embodiment;

FIG. 13 illustrates syntax of additional information including chrominance compensation information, according to an exemplary embodiment;

FIG. 14A is a flowchart illustrating a method of coding additional information including luminance compensation information, according to an exemplary embodiment;

FIG. 14B is a flowchart illustrating a method of decoding additional information including luminance compensation information, according to an exemplary embodiment;

FIG. 18A illustrates syntax of additional information including information regarding a motion vector, according to an exemplary embodiment;

FIG. 18B illustrates syntax of additional information including information regarding a motion vector, according to another exemplary embodiment;

FIG. 20A illustrates syntax of additional information including motion vector coding information, according to an exemplary embodiment;

FIG. 20B illustrates syntax of additional information including motion vector coding information, according to another exemplary embodiment;

DETAILED DESCRIPTION OF EXEMPLARY EMBODIMENTS

Figure 1:
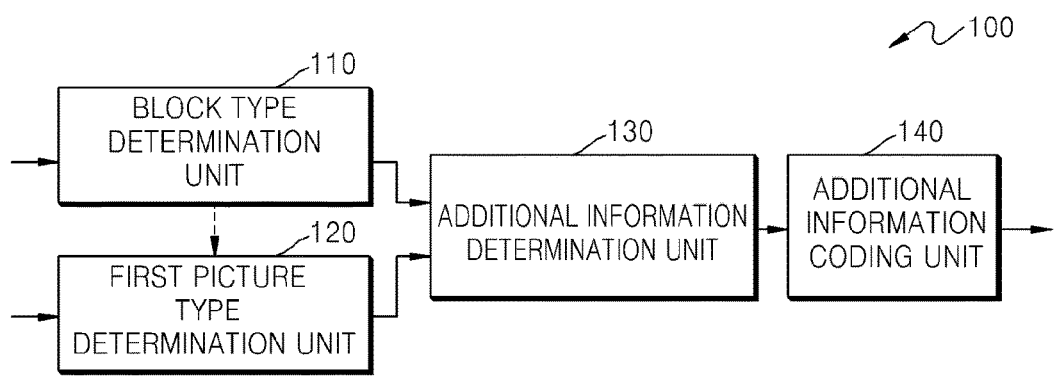
FIG. 1 is a block diagram of a multi-view video coding apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. Expressions such as "at least one of," when preceding a list of elements, modify the entire list of elements and do not modify the individual elements of the list.

FIG. 1 is a block diagram of a multi-view video coding apparatus 100 according to an exemplary embodiment. Referring to FIG. 1, the multi-view video coding apparatus 100 includes a block type determination unit 110, a first picture type determination unit 120, an additional information determination unit 130, and an additional information coding unit 140.

The block type determination unit 110 determines a block type indicating a method of determining a motion vector of a current block present in a current picture from among multi-view video pictures that are to be coded, and outputs information regarding the determined block type to the additional information determination unit 130.

According to an exemplary embodiment, the multi-view video coding apparatus 100 uses additional information in consideration of a first picture type as well as the block type, and the determining result of the block type determination unit 110 may influence the operation of the first picture type determination unit 120.

The block type determination unit 110 may determine whether the current block is a skip mode block type and set the block type of the current block accordingly. For example, in an exemplary embodiment applied to multi-view video coding (MVC), the block type may include at least one of a skip mode block, a direct mode block, and an inter mode block. The skip mode block has no unique vector of the current block. That is, a motion vector of the skip mode block is zero or is determined based on a motion vector of a neighboring block of the current block. Block data including residual data of the skip mode block is not coded. In an exemplary embodiment, whether the current block is the skip mode block may be determined.

The first picture type determination unit 120 determines a first picture type indicating whether the current picture is a reference picture for inter prediction from among multi-view video pictures that are to be coded, and outputs information regarding the determined first picture type to the additional information determination unit 130. In an exemplary embodiment, if both the first picture type and the block type are considered to determine additional information, whether the first picture type determination unit 120 operates may be determined according to the determining result of the block type determination unit 110.

For example, in an exemplary embodiment applied to MVC, the first picture type may be categorized into an anchor picture type and a non-anchor picture type. A picture of the anchor picture type is a reference picture used for inter-view predicting another picture from a different viewpoint and for inter predicting another picture from the same viewpoint. Therefore, inter-view prediction and inter prediction may be performed on the picture of the anchor picture type. In this case, whether the current picture is an anchor picture may be determined.

The additional information determination unit 130 determines additional information of the current picture, based on at least one of the block type of the current block which is determined by the block type determination unit 110 and the first picture type of the current picture which is determined by the first picture type determination unit 120. Furthermore, the additional information determination unit 130 outputs the additional information to the additional information coding unit 140.

The additional information determination unit 130 may determine the additional information of the current picture only when the current block is the skip mode block, though it is understood that other exemplary embodiments are not limited thereto. For example, according to another exemplary embodiment, the additional information determination unit 130 may determine the additional information of the current picture when the current block is the skip mode block and the current picture is an anchor picture.

Although not shown in FIG. 1, the multi-view video coding apparatus 100 may further include a second picture type determination unit which determines a second picture type of the current picture. In this case, the additional information determination unit 130 may determine the additional information of the current picture in consideration of the block type of the current block, the first picture type of the current picture, and the second picture type of the current picture. For example, if the second picture type includes at least one of an intra-coded (I) picture type, a predictive-coded (P) picture type, and a bi-directional (B) picture type, the additional information determination unit 130 may determine the additional information of the current picture only when the current picture is the P picture type.

Also, although not shown in FIG. 1, the multi-view video coding apparatus 100 may further include an additional information coding information determination unit which determines additional information coding information indicating whether to code the additional information of the current picture. In this case, the additional information determination unit 130 may determine the additional information of the current picture in consideration of the block type of the current block and the additional information coding information. A method of determining the additional information coding information will be described in detail below with reference to FIGS. 9A through 11.

The additional information determination unit 130 may include a chrominance information determination unit (not shown) which determines chrominance information of the current block in order to perform chrominance compensation on the current block, and a chrominance compensation performing unit which performs chrominance compensations by using the chrominance information. The chrominance information and a method of determining the chrominance information will be described in detail below with reference to FIGS. 12A through 13.

Also, the additional information determination unit 130 may include a luminance information determination unit (not shown) which determines luminance information of the current block in order to perform luminance compensation on the current block, and a luminance compensation performing unit which perform luminance compensations by using the luminance information. The luminance information and a method of determining the luminance information will be described in detail below with reference to FIGS. 14A through 15.

Moreover, the additional information determination unit 130 may include a motion vector determination unit (not shown) which determines a motion vector of the current block in order to perform motion compensation on the current block, and a motion compensation performing unit which performs motion compensations by using the determined motion vector. The motion vector and a method of determining the motion vector will be described in detail below with reference to FIGS. 16 through 20B.

The additional information coding unit 140 receives the additional information of the current picture from the additional information determination unit 130, and codes the additional information. The coded additional information may be inserted into a bitstream including the multi-view video coded by the multi-view video coding unit 100.

The additional information coded by the additional information coding unit 140 may include at least one of chrominance information, luminance information, and information regarding a motion vector. The chrominance information may be either a chrominance compensation value of the current block, or a difference between the chrominance compensation value and a predicted chrominance compensation value, which is predicted from a chrominance compensation value of a neighboring block. The luminance information may be a luminance compensation value of the current block, or a difference between the luminance compensation value and a predicted luminance compensation value, which is predicted from a luminance compensation value of a neighboring block. Furthermore, the information regarding the motion vector may include information regarding a reference picture for motion estimation.

Figure 2:
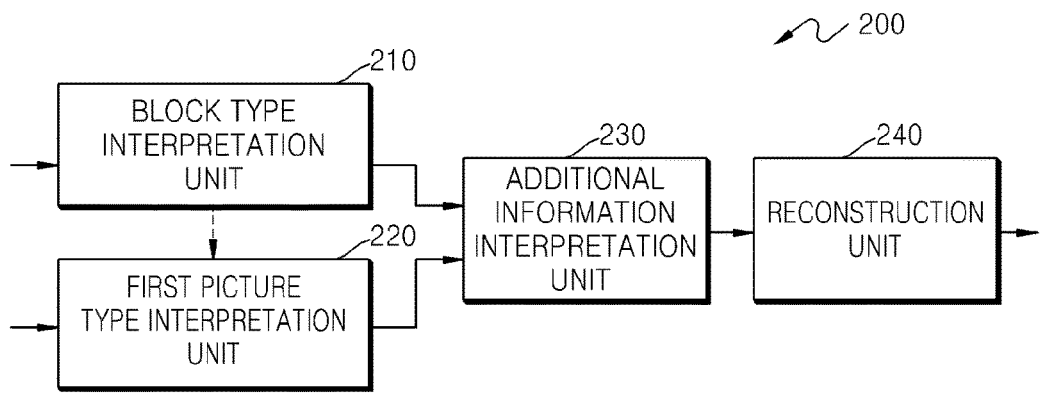
FIG. 2 is a block diagram of a multi-view video decoding apparatus according to an exemplary embodiment.

FIG. 2 is a block diagram of a multi-view video decoding apparatus 200 according to an exemplary embodiment. Referring to FIG. 2, the multi-view video decoding apparatus 200 includes a block type interpretation unit 210, a first picture type interpretation unit 220, an additional information interpretation unit 230, and a reconstruction unit 240. The multi-view video decoding apparatus 200 may parse a received bitstream, may extract from the bitstream information used for video reconstruction (such as picture video data, picture information, block information, and other information related to coding), and may transmit the extracted information to the block type interpretation unit 210, the first picture type interpretation unit 220, the additional information interpretation unit 230, and the reconstruction unit 240. Hereinafter, first and second picture types and a block type are as described above.

The block type interpretation unit 210 interprets a block type indicating a method of determining a motion vector of a current block present in a current picture from among multi-view video pictures that are to be decoded, and outputs information regarding the interpreted block type to the additional information interpretation unit 230.

If the block type and the first picture type are considered in order to interpret the additional information, the first picture type interpretation unit 220 may operate according to an interpreting result of the first picture interpretation unit 210.

The block type interpretation unit 210 may interpret information regarding the block type of the current block and determine whether the current block is a skip mode block.

For example, in an exemplary embodiment applied to MVC, the block type may include at least one of a skip mode block, a direct mode block, and an inter mode block. In this case, whether the current block is the skip mode block may be determined.

The first picture type interpretation unit 220 interprets the first picture type indicating whether the current picture is a reference picture for inter prediction, and outputs information regarding the interpreted first picture type to the additional information interpretation unit 230. In an exemplary embodiment, if the first picture type and the block type are considered to interpret the additional information, the first picture type interpretation unit 220 may operate depending on the interpreting result of the block type interpretation unit 210.

For example, in an exemplary embodiment applied to MVC, the first picture type may be categorized into an anchor picture type and a non-anchor picture type. In this case, whether the current picture is an anchor picture may be determined.

The additional information interpretation unit 230 interprets the additional information of the current picture, based on at least one of the block type interpreted by the block type interpretation unit 210 and the first picture type interpreted by the first picture type interpretation unit 220, and outputs the interpreting result to the reconstruction unit 240.

The additional information interpretation unit 230 may interpret the additional information only when the current block is a skip mode block, though it is understood that other exemplary embodiments are not limited thereto. For example, according to another exemplary embodiment, the additional information interpretation unit 230 may interpret the additional information when the current block is a skip mode block and the current picture is an anchor picture.

Although not shown FIG. 2, the multi-view video decoding apparatus 200 may further include a second picture type interpretation unit which interprets a second picture type of the current picture. In this case, the additional information interpretation unit 230 may interpret the additional information based on the block type of the current block, the first picture type of the current picture, and the second picture type of the current picture. For example, if the second picture type includes at least one of an I picture type, a P picture type and a B picture type, the additional information interpretation unit 230 may determine that additional information of the current picture only when the current picture is the P picture type.

Also, although not shown in FIG. 2, the multi-view video decoding apparatus 200 may further include an additional information coding information interpretation unit which interprets additional information coding information indicating whether the additional information of the current picture is coded. In this case, the additional information interpretation unit 230 may interpret the additional information of the current picture from the bitstream in consideration of the block type of the current block and the additional information coding information. A method of interpreting the additional information coding information will be described in detail below with reference to FIGS. 9A through 11.

The additional information interpretation unit 230 may include a chrominance information interpretation unit (not shown) which interprets chrominance information of the current block in order to perform chrominance compensation on the current block. The chrominance information may be a chrominance compensation value of the current block or a difference between the chrominance compensation value and a predicted chrominance compensation value which is predicted from a chrominance compensation value of a neighboring block. The chrominance information and a method of determining the chrominance information will be described in detail below with reference to FIGS. 12A through 13.

Also, the additional information interpretation unit 230 may include a luminance information interpretation unit (not shown) which interprets luminance information of the current block in order to perform luminance compensation on the current block. The luminance information may be a luminance compensation value of the current block, or a difference between the luminance compensation value and a predicted luminance compensation value which is predicted from a luminance compensation value of a neighboring block. The luminance information and a method of determining the luminance information will be described in detail below with reference to FIGS. 14A through 15.

Furthermore, the additional information interpretation unit 230 may include a motion vector interpretation unit (not shown) which interprets information regarding a motion vector of the current block in order to perform motion compensation on the current block. The information regarding the motion vector information may be a motion vector of the current block, or a difference between the motion vector and a predicted value of the motion vector which is predicted from a motion vector of a neighboring block. Also, the information regarding the motion vector may include information regarding a reference picture for motion compensation. The motion vector and a method of determining the motion vector will be described in detail below with reference to FIGS. 16 through 20B.

The reconstruction unit 240 reconstructs the current block and the current picture by using the additional information received from the additional information determination unit 130, The additional information used by the reconstruction unit 240 may include at least one of chrominance information, luminance information, and information regarding a motion vector. The reconstruction unit 240 may perform chrominance compensation by using the chrominance information received from the additional information interpretation unit 230 and reconstruct the current block. Moreover, the reconstruction unit 240 may perform luminance compensation by using the luminance information received from the additional information interpretation unit 230 and reconstruct the current block accordingly. Furthermore, the reconstruction unit 240 may perform motion compensation by using the motion vector received from the additional information interpretation unit 230 and reconstruct the current block accordingly.

In the multi-view video coding apparatus 100 and the multi-view video decoding apparatus 200 according to exemplary embodiments, if the current picture is an anchor picture captured from a predetermined viewpoint, a reference picture for predicting the current picture may also be an anchor picture from another viewpoint.

Figure 3:
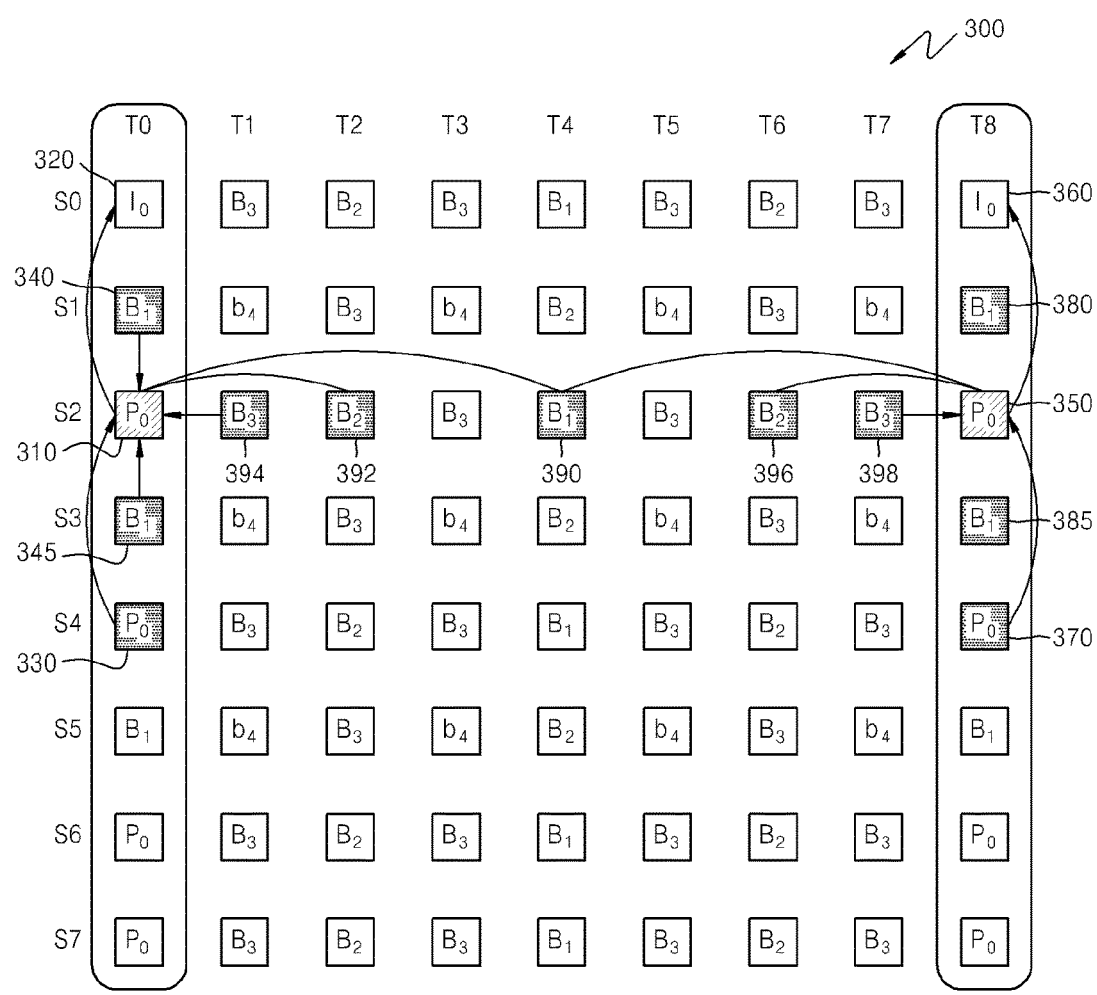
FIG. 3 is a diagram illustrating a method of predicting multi-view video according to an exemplary embodiment.

FIG. 3 is a diagram illustrating a method of predicting multi-view video according to an exemplary embodiment. In the present exemplary embodiment, prediction between pictures is used for multi-view video coding/decoding. In FIG. 3, a set 300 of pictures of a multi-view video is an example of a prediction model when eight viewpoints S0 through S7 exist in multi-view video coding/decoding, i.e., when the size of a group of pictures (GOP) at the same point of time is eight. Here, S0 through S7 respectively denote various viewpoints, and T0 through T8 respectively denote times on a time axis.

Prediction is performed using hierarchical B-picture coding when coding/decoding pictures from the eight viewpoints S0 through S7 on the time axis. Pictures from the viewpoints S0 through S7 at the first time T0 and pictures respectively followed by eight frames, e.g., pictures at the times T8, T16, and T24, may be referred to as anchor pictures.

Anchor pictures are predicted only in a direction of viewpoints. For example, an anchor picture from the viewpoint S2 is predicted using an anchor picture from the viewpoint S0 at the same point of time, an anchor picture from the viewpoint S1 is predicted using anchor pictures from the viewpoints S0 and S2 at the same point of time, an anchor picture from the viewpoint S4 is predicted using an anchor picture from the viewpoint S2 at the same point of time, an anchor picture from the viewpoint S3 is predicted using anchor pictures from the viewpoints S2 and S4 at the same point of time, an anchor picture from the viewpoint S6 is predicted using an anchor picture from the viewpoint S4 at the same point of time, an anchor picture from the viewpoint S5 is predicted using anchor pictures from the viewpoints S4 and S6 at the same point of time, and an anchor picture from the viewpoint S7 is predicted using an anchor picture from the viewpoint S6 at the same point of time.

Non-anchor pictures are generally predicted on the time axis. Thus, a non-anchor picture is predicted by directly or indirectly referring to an anchor picture of a GOP at the same point of time. Accordingly, the quality of the anchor picture influences not only the quality of the non-anchor picture but also the quality of all the pictures of the same GOP. Therefore, the quality of the anchor picture is particularly important for precise and efficient prediction.

In the present description, "a picture $Tn/Sm/X_k$" refers to an X type picture that is captured from an $m^{th}$ viewpoint Sm at $n^{th}$ time Tn and is to be referred to in a $k^{th}$ order. The X type includes an I type, a B type, and a P type.

For example, if the quality of the anchor pictures $T0/S2/P_0$ 310 and $T8/S2/P_0$ 350 is degraded, the efficiency of predicting the anchor pictures $T0/S1/B_1$ 340, $T0/S3/B_1$ 345, $T0/S4/P_0$ 330, $T8/S1/B_1$ 380, $T8/S3/B_1$ 385, and $T8/S4/P_0$ 370 by directly referring to the anchor pictures $T0/S2/P_0$ 310 and $T8/S2/P_0$ 350 may be lowered, thus causing degradation of the video quality.

Accordingly, the efficiency of predicting the anchor pictures $T0/S5/B_1$, $T0/S6/P_0$, $T8/S5/B_1$, and $T8/S6/P_0$ by referring to the degraded anchor pictures $T0/S4/P_0$ 330, and $T8/S4/P_0$ 370 may also be lowered, thus worsening the video quality.

Also, the efficiency of predicting the anchor pictures $T0/S7/P_0$ and $T8/S7/P_0$ by referring to the degraded anchor pictures $T0/S6/P_0$ and $T8/S6/P_0$ may be lowered, and thus, the video quality may be continuously degraded.

Accordingly, if the quality of anchor pictures is degraded, the quality of non-anchor pictures that are predicted by respectively referring to the anchor pictures is also degraded.

For example, in the case of prediction from the viewpoint S2 on the time axis, the quality of a non-anchor picture $T4/S2/B_1$ 390 predicted by directly referring to the anchor pictures $T0/S2/P_0$ 310 and $T8/S2/P_0$ 350, non-anchor pictures $T2/S2/B_2$ 392 and $T6/S2/B_2$ 396 predicted by referring to the non-anchor picture $T4/S2/B_1$ 390, and the other $B_3$ pictures $T1/S2/B_3$ 394 and $T7/S2/B_3$ 398 captured from the viewpoint S2 may be degraded.

Thus, the anchor pictures $T0/S2/P_0$ 310 and $T8/S2/P_0$ 350 influence the quality of all the pictures belonging to the GOP, except for pictures from the viewpoint S0, e.g., anchor pictures $T0/S0/I_0$ 320 and $T8/S0/I_0$ 360 to which the anchor pictures $T0/S2/P_0$ 310 and $T8/S2/P_0$ 350 refer. For this reason, precise anchor picture information is used to precisely code or decode the GOP.

Figure 4A:
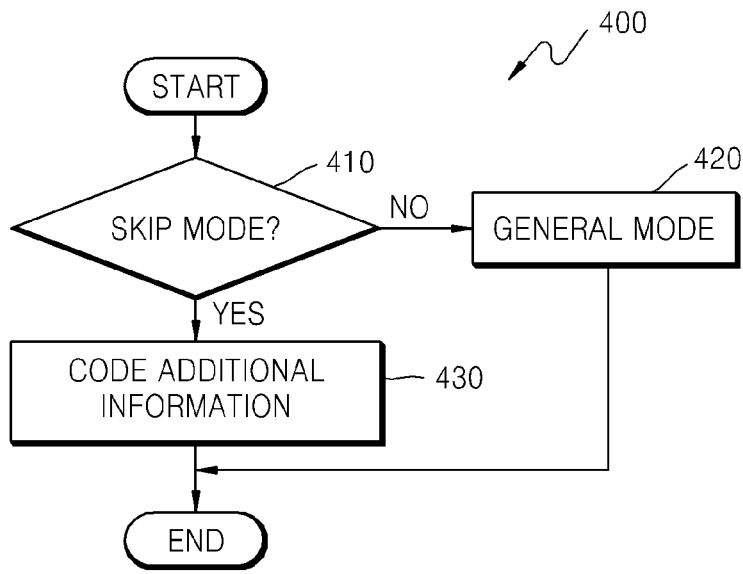
FIG. 4A is a flowchart illustrating a method of determining whether to code additional information in consideration of a block type according to an exemplary embodiment.

FIG. 4A is a flowchart illustrating a method 400 of determining whether to code additional information in consideration of a block type according to an exemplary embodiment. In FIG. 4A, operations of a block type determination unit 110 and an additional information determination unit 130 of a multi-view video coding apparatus 100 according to an exemplary embodiment will be described in detail. In the method 400, the multi-view video coding apparatus 100 sets and codes additional information of a skip mode block.

Referring to FIG. 4A, the block type determination unit 110 determines whether a current block is a skip mode type (operation 410). If the current block is not the skip mode type, a coding process for a general block type is performed (operation 420). If the current block is a skip mode type, the additional information determination unit 130 determines the additional information and the additional information coding unit 140 codes the additional information (operation 430).

Figure 4B:
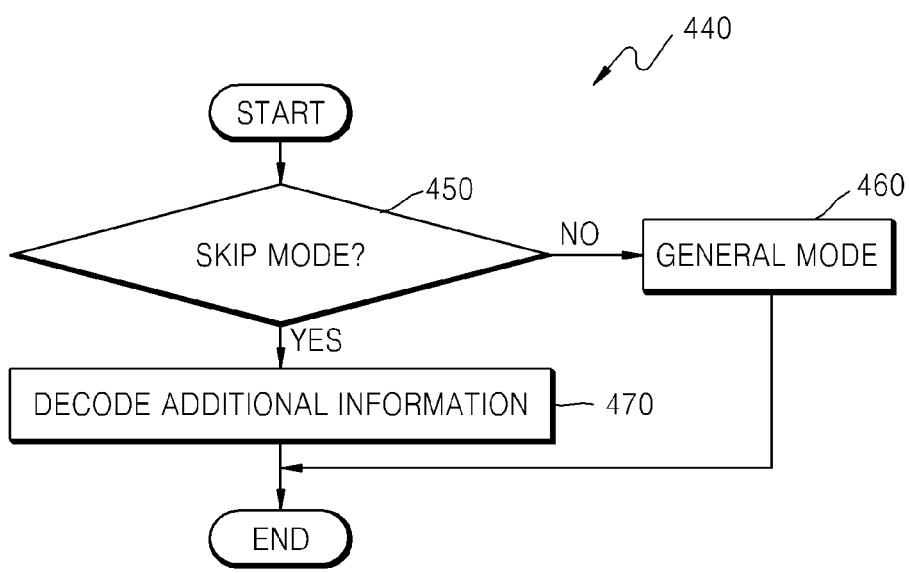
FIG. 4B is a flowchart illustrating a method of determining whether to decode additional information in consideration of a block type according to an exemplary embodiment.

FIG. 4B is a flowchart illustrating a method 440 of determining whether to decode additional information in consideration of a block type according to an exemplary embodiment. In FIG. 4B, operations of a block type interpretation unit 210 and an additional information interpretation unit 230 of a multi-view video decoding apparatus 200 according to an exemplary embodiment will be described in detail. In the method 440, the multi-view video decoding apparatus 200 interprets additional information of a skip mode block and reconstructs a current block.

Referring to FIG. 4B, the block type interpretation unit 210 interprets whether the current block is a skip mode block type (operation 450). If the current block is not the skip mode type, a decoding process for a general block type is performed (operation 460). If the current block is the skip mode type, the additional information interpretation unit 230 interprets the additional information and the reconstruction unit 240 reconstructs the current block by using the additional information (operation 470).

If a block of an anchor picture is determined as a skip mode type block, image quality degradation may occur in the skip mode type block since a difference between images from different viewpoints, e.g., at least one of a difference between levels of luminance signals, a difference between levels of chrominance signals, and a residual image, is not coded. Thus, the quality degradation of the anchor picture may reduce the whole prediction efficiency. Accordingly, if additional information for improving the image quality of the skip mode block is coded, it is possible to improve the performance and efficiency of prediction even during a decoding process.

Figure 5A:
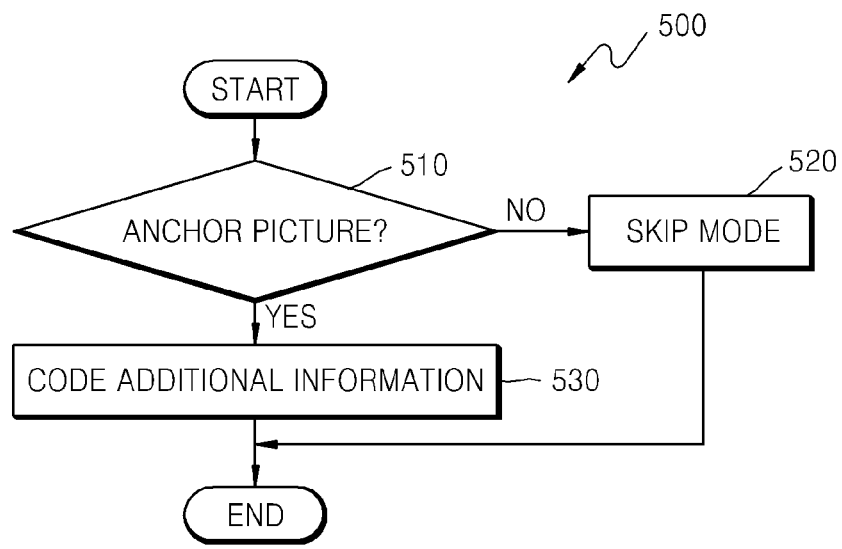
FIG. 5A is a flowchart illustrating a method of determining whether to code additional information in consideration of a first picture type according to an exemplary embodiment.

FIG. 5A is a flowchart illustrating a method 500 of determining whether to code additional information in consideration of a first picture type according to an exemplary embodiment. Referring to FIG. 5A, operations of a first picture type determination unit 120 and an additional information determination unit 130 of a multi-view video coding apparatus 100 according to an exemplary embodiment will be described in detail. In the method 500, the multi-view video coding apparatus 100 sets and codes additional information when a current block is a skip mode block and a current picture to which the current block belongs is an anchor picture type of the first picture type.

Referring to FIG. 5A, the first picture type determination unit 120 determines whether the current picture is an anchor picture type (operation 510). If the current picture is not an anchor picture, a general coding process for a skip mode block is performed on the current block (operation 520). If the current picture is an anchor picture, the additional information determination unit 130 determines additional information and the additional information coding unit 140 codes the additional information (operation 530).

Figure 5B:
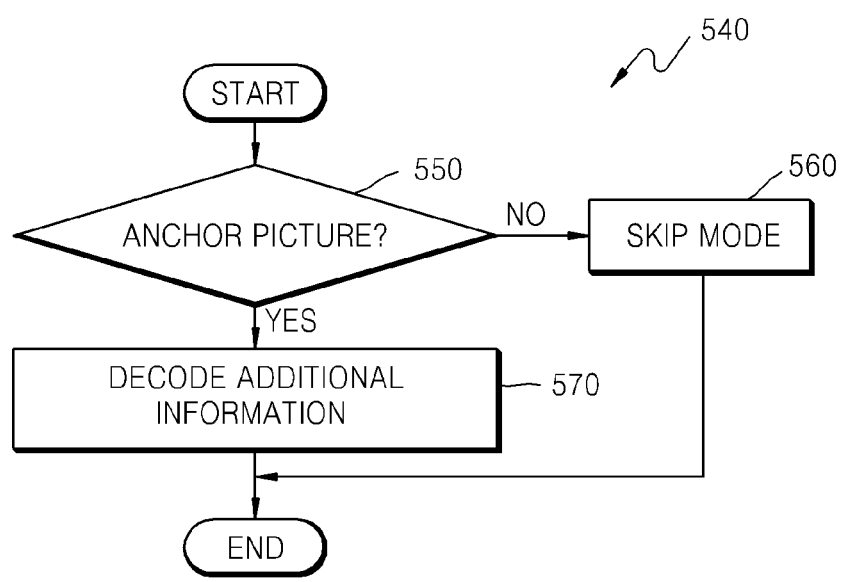
FIG. 5B is a flowchart illustrating a method of determining whether to decode additional information in consideration of a first picture type according to an exemplary embodiment.

FIG. 5B is a flowchart illustrating a method 540 of determining whether to decode additional information in consideration of a first picture type according to an exemplary embodiment of the present invention. Referring to FIG. 5B, operations of a first picture type interpretation unit 220 and an additional information interpretation unit 230 of a multi-view video decoding apparatus 200 according to an exemplary embodiment will be described in detail. In the method 540, the multi-view video decoding apparatus 200 interprets additional information and reconstructs a current block when the current block is a skip mode block and a current picture to which the current block belongs is an anchor picture type of the first picture type.

Referring to FIG. 5B, the first picture type interpretation unit 220 interprets whether the current picture is an anchor picture type (operation 550). If the current picture is not an anchor picture, a general decoding process for a skip mode block is performed on the current block (operation 560). If the current picture is an anchor picture, the additional information interpretation unit 230 interprets additional information and the reconstruction unit 240 reconstructs the current block by using the additional information (operation 570).

Even in a skip mode, information of another block is applied to the current block by performing inter prediction on a GOP captured from the same viewpoint along the time axis. Multi-view video is predicted using information of another video along the time axis and information regarding pictures from different viewpoints. Thus if a skip mode block belongs to an anchor picture and is predicted based on information regarding a picture captured from another viewpoint at the same point of time, the information of the anchor picture is delivered in series to all pictures of the multi-view video. Accordingly, the multi-view video can be precisely predicted based on both temporal information and information regarding viewpoints.

FIG. 6A illustrates a former part 600 of slice_data syntax for coding/decoding multi-view video including additional information in consideration of a first picture type and a block type, according to an exemplary embodiment.

In order to perform coding or decoding for improving the quality of an anchor picture while directly using skip mode syntax of multi-view video coding/decoding, additional information is inserted into the skip mode syntax in order to improve the quality of the current picture, when a current picture is determined as an anchor picture based on information indicating whether an M×N block that is to be decoded is a skip mode block and information indicating whether the current picture is an anchor picture. Here, M×N may be 16×16, 8×8, or various other combinations of numbers. Since related art skip mode syntax may be directly used, it is possible to code or decode multi-view video by changing only information used for the syntax without great efforts and costs to change the structure of a related art multi-view video coding or decoding system.

In the slice_data syntax 600, mb_skip_run 610 is syntax representing a skip mode block when entropy coding is performed using context-based adaptive variable-length coding (CAVLC) during multi-view video coding/decoding. That is, the mb_skip_run 610 is information indicating a total number of blocks skipped in series. Referring to line 13 of the slice_data syntax 600, a loop is performed a number of times corresponding to the total number of skipped macro blocks.

According to an "if" condition described at lines 14 to 20 of the slice_data syntax 600, anchor_enhancement_information( ) 620 is added to code or decode the additional information when the current picture is an anchor picture.

mb_skip_flag 630 at line 21 of the slice_data syntax 600 is syntax representing a skip mode block when entropy coding is performed using context-based adaptive binary arithmetic coding (CABAC) during multi-view video coding/decoding. That is, the mb_skip_flag 630 is information indicating whether a current block has been skipped. If the mb_skip_flag 630 is 1, that the mb_skip_flag 630 indicates that the current block has been skipped.

The "if" condition of lines 22 to 25 of the slice_data syntax 600 indicates that the current block has been skipped and anchor_enhancement_information( ) 640 is added to code or decode the additional information when a current picture is an anchor picture. Various exemplary embodiments of the syntaxes, anchor_enhancement_information( ) 620 and 640, will be described later with reference to FIGS. 13, 15, 18A, 18B, 20A and 20B.

FIG. 6B illustrates a latter part 605 of the slice_data syntax of FIG. 6A, according to an exemplary embodiment.

Figure 7A:
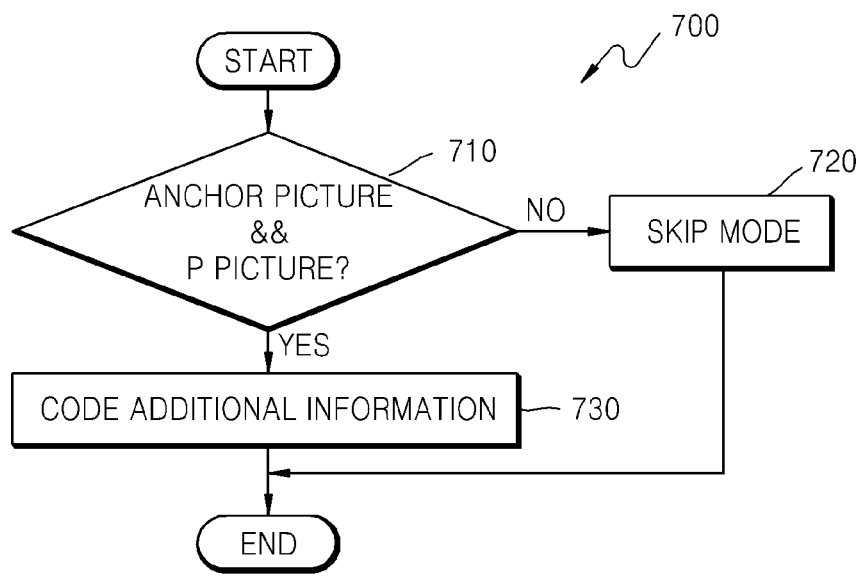
FIG. 7A is a flowchart illustrating a method of determining whether to code additional information in consideration of a first picture type and a second picture type according to an exemplary embodiment.

FIG. 7A is a flowchart illustrating a method 700 of coding additional information in consideration of a second picture type as well as a first picture type, according to an exemplary embodiment. Operations of a first picture type determination unit 120, a second picture type determination unit and an additional information determination unit 130 of a multi-view video coding apparatus 100 according to an exemplary embodiment will be described in detail with reference to FIG. 7A. In the method 700, if a current block is a skip mode block, the multi-view video coding apparatus 100 sets and codes additional information when a current picture to which the current block belongs is an anchor picture type of the first picture type and a P picture type of the second picture type.

Referring to FIG. 7A, the first picture type determination unit 120 determines whether the current picture is the anchor picture type and the second picture type determination unit determines whether the current picture is the P picture type (operation 710). If the current picture is not an anchor picture and a P picture, a general coding operation for a skip mode block is performed on the current block (operation 720). If the current picture is an anchor picture and a P picture, the additional information determination unit 130 determines the additional information and the additional information coding unit 140 codes the additional information (operation 730).

Figure 7B:
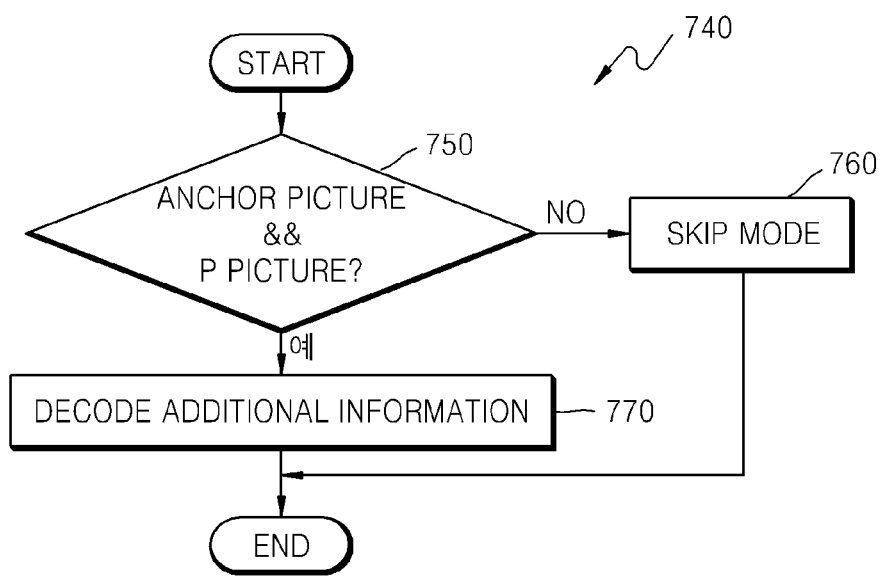
FIG. 7B is a flowchart illustrating a method of determining whether to decode additional information in consideration of a first picture type and a second picture type according to an exemplary embodiment.

FIG. 7B is a flowchart illustrating a method 740 of decoding additional information in consideration of a second picture type as well as a first picture type, according to an exemplary embodiment. Operations of a first picture type interpretation unit 220, a second picture type interpretation unit, and an additional information interpretation unit 230 of a multi-view video decoding apparatus 200 according to an exemplary embodiment will be described in detail with reference to FIG. 7B. In the method 740, if a current block is a skip mode block, the multi-view video decoding apparatus 200 interprets the additional information and reconstructs the current block when a current picture to which the current block belongs is an anchor picture type of the first picture type and a P picture type of the second picture type.

Referring to FIG. 7B, the first picture type interpretation unit 220 determines whether the current picture is the anchor picture type and the second picture type interpretation unit determines whether the current picture is the P picture type (operation 750). If the current picture is not an anchor picture and a P picture, a general decoding operation for a skip mode block is performed on the current block (operation 760). If the current picture is an anchor picture and a P picture, the additional information interpretation unit 230 interprets the additional information and the reconstruction unit 240 reconstructs the current block by using the additional information (operation 770).

FIG. 8 illustrates a former part of slice_data syntax 800 for coding or decoding multi-view video including additional information in consideration of a second picture type as well as a first picture type, according to an exemplary embodiment.

In order to perform coding or decoding for improving the quality of an anchor picture while directly using skip mode syntax of multi-view video coding/decoding, the additional information is inserted into the skip mode syntax in order to improve the quality of the current picture when a current picture is determined as an anchor picture and a P picture based on information indicating whether an M×N block that is to be decoded is a skip mode block, information indicating whether the current picture is an anchor picture, and information indicating whether the current picture is a P picture.

In the slice_data syntax 800, functions of mb_skip_run' 810 at line 11 and mb_skip_flag 830 at line 21 are respectively the same as or similar to the above mb_skip_run 610 and the mb_skip_flag 630.

The "if" condition of lines 14 to 20 of the slice_data syntax 800 indicates that when a current picture is an anchor picture and a P picture, anchor_enhancement_information( ) 820 is used to code or decode the additional information.

The "if" condition of lines 22 to 26 of the slice_data syntax 800 indicates that if the current block is skipped and the current picture is an anchor picture and a P picture, anchor_enhancement_information( ) 840 is used to code or decode the additional information. Various exemplary embodiments of the syntaxes, anchor_enhancement_information( ) 820 and 840, will be described later with reference to FIGS. 19 and 20.

A latter part of the slice_data syntax 800 may be the same as or similar to the syntax 605 illustrated in FIG. 6B.

Figure 9A:
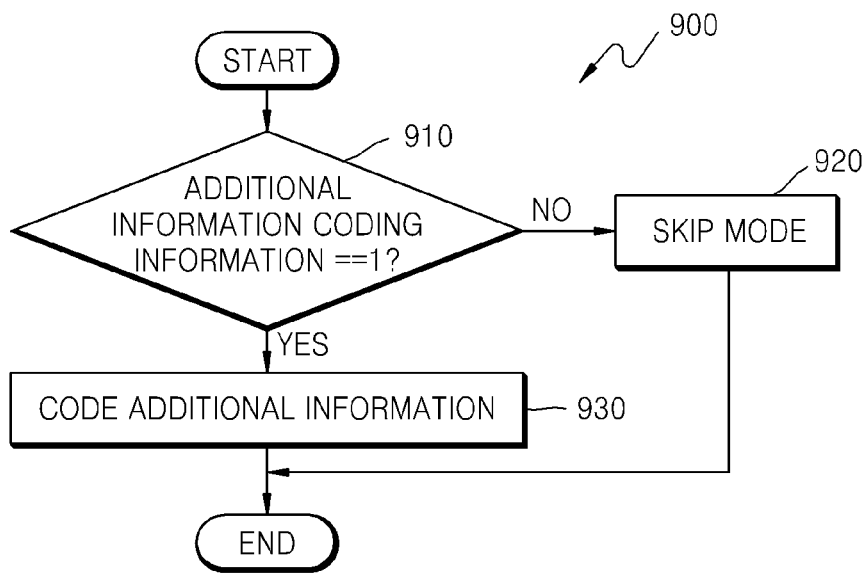
FIG. 9A is a flowchart illustrating a method of determining whether to code additional information in consideration of additional information coding information according to an exemplary embodiment.

FIG. 9A is a flowchart illustrating a method 900 of determining whether to code additional information based on additional information coding information according to an exemplary embodiment. Operations of an additional information coding information determination unit and an additional information determination unit 130 of a multi-view video coding apparatus 100 according to an exemplary embodiment will be described in detail with reference to FIG. 9A. In the method 900, if a current block is a skip mode block, the multi-view video coding apparatus 100 selectively sets and codes the additional information according to whether to code additional information of a current picture to which the current block belongs.

Referring to FIG. 9A, the additional information coding information determination unit determines whether to code the additional information of the current picture (operation 910). If the additional information is not to be coded, a general coding operation for a skip mode block is performed on the current block (operation 920). If the additional information is to be coded, the additional information determination unit 130 determines the additional information and the additional information coding unit 140 codes the additional information (operation 930).

In an exemplary embodiment, the additional information coding information determination unit may compare pixel values of the current picture with those of a reference picture in order to determine the additional information coding information. For example, the additional information coding information determination unit calculates the averages of respective Y components, U components, and V components of pixels of the current picture, and the averages of respective Y components, U components, and V components of pixels of a reference picture.

Furthermore, according to an exemplary embodiment, the additional information coding information determination unit may calculate absolute values of differences between averages of values of each of color components of the current picture and a reference picture with respect to Y, U, and V components, and then calculates the sum of the absolute values. In this case, the additional information coding information determination unit calculates the absolute value of the difference between the average of the values of the Y components of the current picture and the average of the values of the Y components of the reference picture, the absolute value of the difference between the average of the values of the U components of the current picture and the average of the values of the U components of the reference picture, and the absolute value of the difference between the average of the values of the V components of the current picture and the average of the values of the V components of the reference picture are calculated. Then, the additional information coding information determination unit calculates the sum of the above absolute values.

If the sum of the absolute values is greater than a predetermined threshold, the additional information coding information determination unit sets the additional information coding information to indicate that the additional information is to be coded. For example, if the predetermined threshold is 1 and the sum of the absolute values is greater than 1, the additional information coding information may be set to 1. Also, if the current picture is not an anchor picture, the additional information coding information may be set to 0.

Figure 9B:
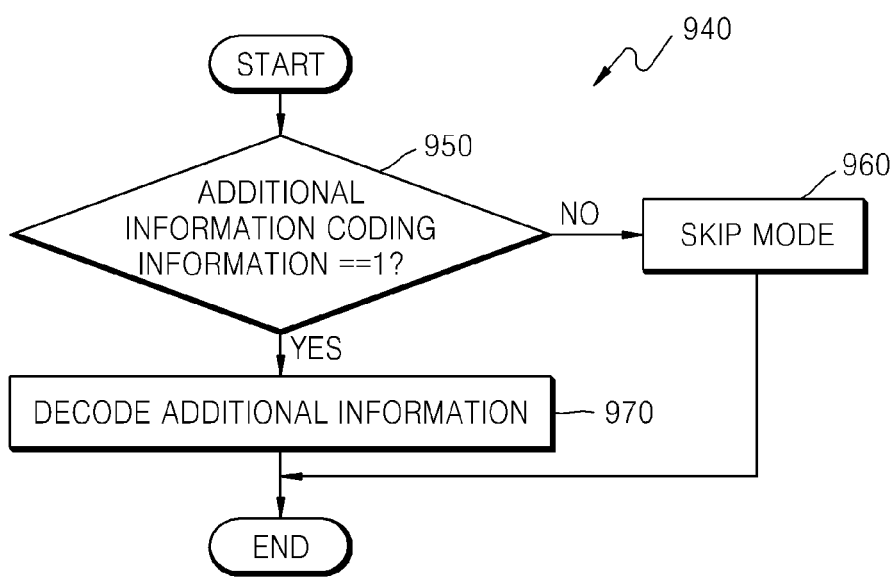
FIG. 9B is a flowchart illustrating a method of determining whether to decode additional information in consideration of additional information coding information according to an exemplary embodiment.

FIG. 9B is a flowchart illustrating a method 940 of determining whether to decode additional information based on additional information coding information according to an exemplary embodiment. Operations of an additional information coding information interpretation unit and an additional information interpretation unit 130 of a multi-view video decoding unit 200 according to an exemplary embodiment will be described in detail with reference to FIG. 9B. In the method 940, the multi-view video decoding apparatus 200 interprets and decodes the additional information when a current block is a skip mode block and additional information of a current picture to which the current block belongs is coded.

Referring to FIG. 9B, the additional information coding information interpretation unit interprets whether the additional information of the current picture is coded (operation 950). If the additional information is not coded, a general decoding operation for a skip mode block is performed on the current block (operation 960). If the additional information is coded, the additional information interpretation unit 230 interprets the additional information and the reconstruction unit 240 reconstructs the current block by using the additional information (operation 970).

FIG. 10 illustrates syntax slice_header 1000 of additional information coding information according to an exemplary embodiment. Referring to FIG. 10, in order to perform coding or decoding for improving the quality of an anchor picture while directly using skip mode syntax of multi-view video coding/decoding, information indicating whether to code additional information of a current picture is inserted into syntax regarding a header of a slice. In the slice_header syntax 1000, user_anchor_enh_inform_flag 1010 is inserted into an "if" condition in order to indicate whether to code the additional information when a current picture is an anchor picture.

FIG. 11 illustrates a former part of syntax slice_data 1100 of coding or decoding multi-view video including additional information in consideration of additional information coding information, according to an exemplary embodiment. Referring to FIG. 11, in order to perform coding or decoding for improving the quality of an anchor picture while directly using skip mode syntax of multi-view video coding/decoding, the additional information is inserted into the skip mode syntax to improve the quality of a current picture, based on information indicating whether an M×N block that is to be decoded is a skip mode block and the additional information coding information indicating whether to code additional information of the current picture.

In the slice_data syntax 1100, the functions of mb_skip_run 1110 at line 11 and mb_skip_flag 1130 at line 21 are respectively the same as or similar to the above mb_skip_run 610 and the mb_skip_flag 630.

The "if" condition of lines 14 to 20 of the slice_data syntax 1100 indicates that anchor_enhancement_information( ) 1120 is used to code or decode the additional information when the additional information coding information of the current picture, i.e., user_anchor_enh_inform_flag 1010, is 1.

The "if" condition of lines 22 to 25 of the slice_data syntax 1100 indicates that anchor_enhancement_information( ) 1140 is used to code or decode the additional information when a current block is skipped and the additional information coding information of the current picture, i.e., the user_anchor_enh_inform_flag 1010, is 1. Various exemplary embodiments of the syntaxes, anchor_enhancement_information( ) 1120 and 1140 will be described later with reference to FIGS. 13, 15, 18A, 18B, 20A and 20B.

A latter part of the slice_data syntax 1100 may be the same as or similar to the syntax 605 illustrated in FIG. 6B.

Figure 12A:
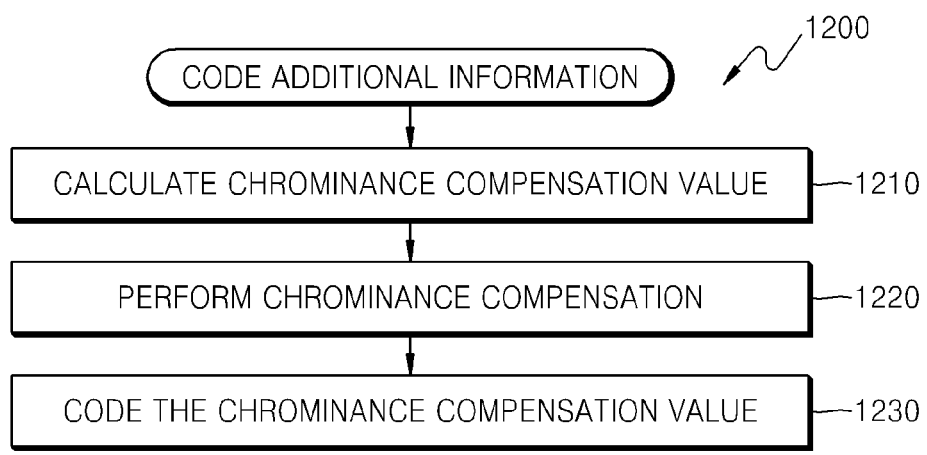
FIG. 12A is a flowchart illustrating a method of coding additional information including chrominance compensation information, according to an embodiment.

FIG. 12A is a flowchart illustrating a method 1200 of coding additional information including a chrominance compensation value according to an exemplary embodiment. Operations of an additional information determination unit 130 and an additional information coding unit 140 of a multi-view video coding apparatus 100 according to an exemplary embodiment will be described in detail with reference to FIG. 12A. In the method 1200, the multi-view video coding apparatus 100 determines and codes chrominance information when the chrominance information is to be coded as additional information of a current picture.

Multi-view video may be obtained by respectively capturing pictures from a plurality of viewpoints by using different cameras. Thus, a chrominance difference may occur between the viewpoints. If multi-view video having a chrominance difference is coded or decoded, a quality of the video may be degraded. Such a chrominance difference cannot be expressed using luminance and thus should be expressed using color components of the video.

Referring to FIG. 12A, the additional information determination unit 130 determines a chrominance compensation value as chrominance information related to a current block (operation 1210). The chrominance compensation value may be an average of differences of all chrominance pixel values of a current block and a reference block corresponding to the current block.

The additional information determination unit 130 performs chrominance compensation by using the chrominance compensation value (operation 1220). Chrominance compensation may be performed simultaneously with performing motion compensation on the current block or may be performed after performing motion compensation.

The additional information coding unit 140 codes the chrominance compensation value as additional information (operation 1230). For example, the chrominance compensation value may be coded by deriving a predicted chrominance compensation value by using neighboring blocks of the current block, and coding as the chrominance information the difference between the a predicted chrominance compensation value and the chrominance compensation value, as provided in the following exemplary Equation (1):

$$\text{Chrominance information to be coded} = \text{chrominance compensation value of current block} - \text{predicted chrominance compensation value} \quad (1)$$

As another example, the chrominance compensation value may be coded by coding the chrominance compensation value of the current block without using prediction coding.

In another exemplary embodiment, operation 1230 may be performed before performing operation 1220. Also, operations 1220 and 1230 may be simultaneously performed.

Figure 12B:
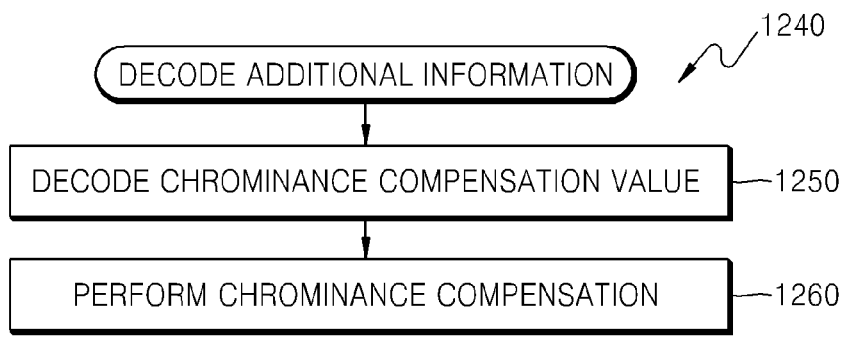
FIG. 12B is a flowchart illustrating a method of decoding additional information including chrominance compensation information, according to an exemplary embodiment.

FIG. 12B is a flowchart illustrating a method 1240 of decoding additional information including chrominance compensation value according to an exemplary embodiment. Operations of an additional information interpretation unit 230 and a reconstruction unit 240 of a multi-view video decoding apparatus 200 according to an exemplary embodiment will be described in detail with reference to FIG. 12B. In the method 1240, the multi-view video decoding apparatus 200 interprets chrominance information and reconstructs a current block by using the chrominance information when the chrominance information can be interpreted from additional information of a current picture.

Referring to FIG. 12B, the additional information interpretation unit 230 decodes and interprets a chrominance compensation value as chrominance information related to a current block (operation 1250). For example, the chrominance compensation value is decoded by deriving a predicted chrominance compensation value by using neighboring blocks of the current block, and reconstructing the chrominance compensation value of the current block by combining the predicted chrominance compensation value with the interpreted chrominance compensation value, as provided in the following exemplary Equation (2):

$$\text{chrominance compensation value of current block} = \text{interpreted chrominance compensation value} + \text{predicted value of chrominance compensation value} \quad (2)$$

As another example, the chrominance compensation value may be coded by determining the interpreted chrominance compensation value as the chrominance compensation value of the current block without using prediction coding in order to reconstruct the chrominance compensation value of the current block.

The reconstruction unit 240 performs chrominance compensation on the current block by using the constructed (determined) chrominance compensation value (operation 1260). Chrominance compensation may be performed simultaneously with performing motion compensation on the current block or may be performed after performing motion compensation. The current block is reconstructed using chrominance compensation and motion compensation and the other blocks are reconstructed in a similar manner, thereby reconstructing the current picture.

FIG. 13 illustrates anchor_chroma_information( ) syntax 1300 of additional information including chrominance compensation information according to an exemplary embodiment. For example, anchor_enhancement_information 1300 including chrominance information may be inserted into the syntaxes, anchor_enhancement_information 620, 640, 820, 840, 1120, and 1140, respectively illustrated in FIGS. 6A, 8 and 11. The additional information may include chrominance information for each of chrominance components. Referring to FIG. 13, the anchor_enhancement_information 1300 includes cb_offset 1310 that is a chrominance compensation value of a U component and cr_offset 1320 that is a chrominance compensation value of a V component.

FIG. 14A is a flowchart illustrating a method of coding additional information including luminance compensation information according to an exemplary embodiment. Operations of an additional information determination unit 130 and an additional information coding unit 140 of a multi-view video coding apparatus 100 according to an exemplary embodiment will be described in detail with reference to FIG. 14A. In the method 1400, the multi-view video coding apparatus 100 determines and codes luminance information when luminance information is to be coded as additional information of a current picture.

Referring to FIG. 14A, the additional information determination unit 130 determines a luminance compensation value as luminance information of a current block (operation 1410). The luminance compensation value may be an average of differences of luminance pixel values of the current block and a reference block corresponding to the current block.

The additional information determination unit 130 performs luminance compensation by using the luminance compensation value (operation 1420). Luminance compensation may be performed simultaneously with performing motion compensation on the current block or may be performed after performing motion compensation.

The additional information coding unit 140 codes the luminance compensation value as the additional information (operation 1430). For example, the luminance compensation value may be coded by deriving a predicted luminance compensation value by using neighboring blocks of the current block and then coding the difference between the predicted luminance compensation value and the luminance compensation value as luminance information, as provided in the following exemplary Equation (3):

$$\text{luminance information to be coded} = \text{luminance compensation value of current block} - \text{predicted luminance compensation value} \quad (3)$$

As another example, the luminance compensation value may be coded by coding the luminance compensation value of the current block without using prediction coding, and the coding result may be inserted into a bitstream.

In another exemplary embodiment, operation 1430 may be performed before performing operation 1420 or operations 1420 and 1430 may be performed simultaneously.

FIG. 14B is a flowchart illustrating a method 1440 of decoding additional information containing luminance compensation information according to an exemplary embodiment. Operations of an additional information interpretation unit 230 and a reconstruction unit 240 of a multi-view video decoding apparatus 200 according to an exemplary embodiment will be described in detail with reference to FIG. 14B. In the method 1440, the multi-view video decoding apparatus 200 interprets luminance information and reconstructs a current block by using the luminance information when the luminance information is to be interpreted from additional information of a current picture.

Referring to FIG. 14B, the additional information interpretation unit 230 decodes and interprets a luminance compensation value as luminance information of a current block (operation 1450). For example, the luminance compensation value may be decoded by deriving a predicted luminance compensation value by using neighboring blocks of the current block and combining the predicted luminance compensation value with the interpreted luminance compensation value in order to reconstruct the luminance compensation value of the current block, as provided in the following exemplary Equation (4):

$$\text{luminance compensation value of current block} = \text{interpreted luminance compensation value} + \text{predicted luminance compensation value} \quad (4)$$

As another example, the luminance compensation value may be coded by determining the interpreted luminance compensation value as the luminance compensation value of the current block without using prediction coding in order to reconstruct the luminance compensation value of the current block.

The reconstruction unit 240 performs luminance compensation on the current block by using the reconstructed luminance compensation value (operation 1460). Luminance compensation may be performed simultaneously with performing motion compensation on the current block or may be performed after performing motion compensation. The current block is reconstructed by performing luminance compensation and motion compensation, and the other blocks are reconstructed in a similar manner, thereby reconstructing the current picture.

Figures 15, 16:
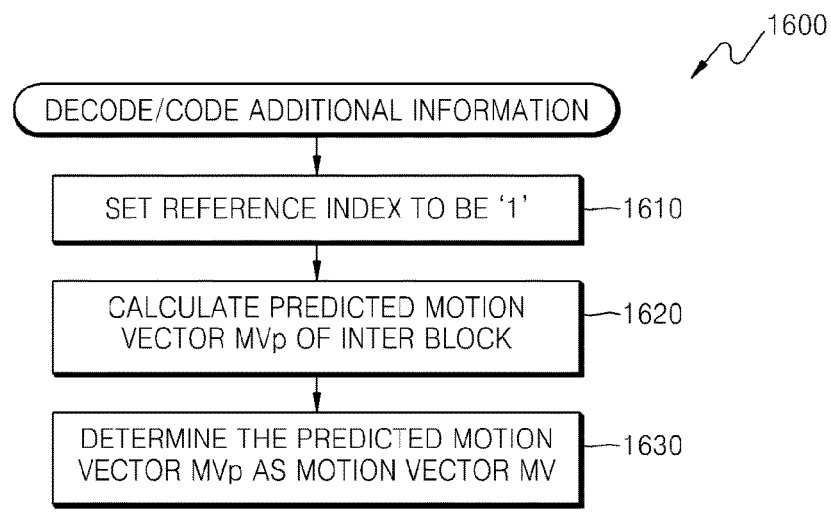
FIG. 15 illustrates syntax of additional information including luminance compensation information, according to an exemplary embodiment.
FIG. 16 is a flowchart illustrating a method of determining a motion vector based on additional information including a reference index for motion estimation, according to an exemplary embodiment.

FIG. 15 illustrates anchor_enhancement_information syntax 1500 of additional information coding information including luminance compensation information according to an exemplary embodiment. For example, the anchor_enhancement_information syntax 1500 that includes luminance information may be inserted into the syntaxes, anchor_ enhancement_information 620, 640, 820, 840, 1120, and 1140 illustrated in FIGS. 6A, 8 and 11. Referring to FIG. 15, the anchor_enhancement_information syntax 1500 includes mb_ic_flag 1510 indicating whether to use a luminance compensation value for a current block and dpcm_of_dvic 1520 representing the luminance information. The dpcm_of_dvic 1520 is a difference between an actual luminance compensation value of the current block and a predicted luminance compensation value, as provided in the following exemplary Equation (5):

$$\text{dpcm\_of\_dvic} = \text{actual luminance compensation value} - \text{predicted luminance compensation value} \quad (5)$$

FIG. 16 is a flowchart illustrating a method of determining a motion vector based on additional information including a reference index for motion estimation according to an exemplary embodiment. Operations of an additional information determination unit 130 of a multi-view video coding apparatus 100 and an additional information interpretation unit 230 of a multi-view video decoding apparatus 200 according to an exemplary embodiment will be described in detail with reference to FIG. 16. In the method 1600, if additional information of a current picture includes luminance information, the multi-view video coding/decoding apparatus 100 or 200, determines and codes or decodes the luminance information.

Referring to FIG. 16, a reference index is set to 0 in order to determine a reference picture for prediction (operation 1610). The reference index represents a reference picture of the current picture to perform motion estimation and compensation on a current block. If the reference index is 0, a previous picture closest to the current picture is determined as a reference picture of the current picture from among pictures that are to be used as reference pictures.

The additional information determination unit 130 or the additional information interpretation unit 230 determines a predicted motion vector $MV_P$ as a motion vector of the current block (operation 1610). The predicted motion vector $MV_P$ is determined in a method similar to a method of determining a predicted motion vector of an inter mode block by using a reference picture corresponding to a reference index 0.

A motion vector of a current block is not additionally set in a skip mode according to a related art method. However, according to an exemplary embodiment, motion information of a current block is determined similar to a method of determining a predicted motion vector of an inter mode block. The predicted motion vector $MV_P$ is determined as the motion vector of the current block (operation 1630).

Figure 17A:
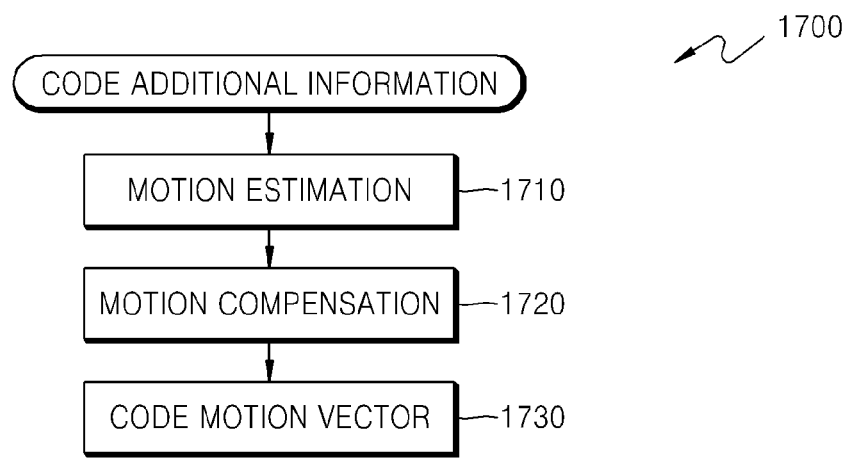
FIG. 17A is a flowchart illustrating a method of coding additional information including information regarding a motion vector, according to an exemplary embodiment.

FIG. 17A is a flowchart illustrating a method 1700 of coding additional information including motion vector information according to an exemplary embodiment. Operations of an additional information determination unit 130 and an additional information coding unit 140 of a multi-view video coding apparatus 100 according to an exemplary embodiment will be described in detail with reference to FIG. 17A. In the method 1700, the multi-view video coding apparatus 100 determines and codes motion information when motion vector information is to be coded as additional information of a current picture.

The additional information determination unit 130 performs motion estimation on a current block in order to determine motion information of the current block (operation 1710). A reference picture for motion estimation may be performed in various ways. For example, if a current block of a current picture is in a P skip mode, a previous reference picture closest to the current picture may be determined as a reference block from among reference pictures of the current picture. As another example, if the current block of the current picture is in a B skip mode, two pictures may be selected as reference pictures for a motion vector of the current block from previous and subsequent reference pictures nearer to the current picture from among reference pictures of the current picture.

The additional information determination unit 130 performs motion compensation by using the motion vector (operation 1720).

The additional information coding unit 140 codes the motion vector as the additional information (operation 1730). The motion vector may be coded by deriving a predicted motion vector (motion vector predictor) $MV_P$ by using neighboring blocks of the current block and coding, as the motion vector information, a motion vector difference $MV_D$ between the predicted motion vector $MV_P$ and the motion vector of the current block, as provided in the following exemplary Equation (6):

$$\text{motion vector to be coded} = \text{motion vector of current block} - \text{predicted motion vector} \quad (6)$$

As another example, the motion vector may be coded by coding the motion vector of the current block without using prediction coding and inserting the coded motion vector into a bitstream. Furthermore, the additional information coding unit 140 may directly code the reference picture and insert the coded reference picture into a bitstream in an exemplary embodiment.

Figure 17B:
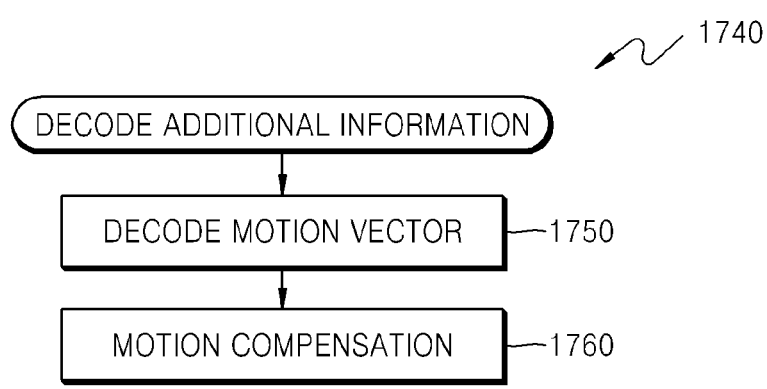
FIG. 17B is a flowchart illustrating a method of decoding additional information including information regarding a motion vector, according to an exemplary embodiment.

FIG. 17B is a flowchart illustrating a method 1740 of decoding additional information that includes motion vector information according to an exemplary embodiment. Operations of an additional information interpretation unit 230 and a reconstruction unit 240 of a multi-view video decoding apparatus 200 according to an exemplary embodiment will be described in detail with reference to FIG. 17B. In the method 1740, if additional information of a current picture includes motion vector information, the multi-view video decoding apparatus 200 interprets a motion vector and reconstructs a current block and the current picture accordingly.

The additional information interpretation unit 230 may determine a predicted motion vector $MV_P$ by using neighboring blocks of the current block and reconstruct a motion vector MV by combining the predicted motion vector $MV_P$ with an interpreted motion vector difference $MV_D$ according to the following exemplary Equation (7) in order to decode the motion vector MV (operation 1750):

$$\text{motion vector to be reconstructed} = \text{interpreted motion vector} + \text{predicted motion vector} \quad (7)$$

A reference picture for motion estimation may be implemented in various ways. For example, if a current block of a current picture is in a P skip mode, a previous reference picture closest to the current picture may be determined as a reference block from among reference pictures of the current picture. As another example, if the current block of the current picture is in a B skip mode, two pictures may be selected as reference pictures for a motion vector of the current block from previous and subsequent reference pictures nearer to the current picture from among reference pictures of the current picture. Moreover, if a reference picture is separately transmitted, an interpreted reference picture may be used for motion estimation and compensation.

The reconstruction unit 240 may perform motion compensation by using the motion vector to reconstruct the current block, and the other blocks may be reconstructed similarly, thereby reconstructing the current picture (operation 1760).

FIG. 18A illustrates anchor_enhancement_information syntax 1800 of additional information including motion vector information according to an exemplary embodiment. For example, the anchor_enhancement_information syntax 1800 including motion information may be inserted into the above syntaxes, anchor_enhancement_information 620, 640, 820, 840, 1120, and 1140, illustrated in FIGS. 6A, 8 and 11. Referring to FIG. 18A, the anchor_enhancement_information syntax 1800 may include mvd_10 1810 representing a motion vector of a previous slice when a current slice is a P type or a B type. Also, the anchor_enhancement_information 1800 may include mvd_11 1820 representing a motion vector of a subsequent picture when the current slice is a B type. The mvd_10 1810 and the mvd_11 1820 may be motion vector differences $MV_D$.

A compIdx value of 0 denotes a motion vector component in a horizontal direction. Conversely, a compIdx value of 1 denotes a motion vector component in a vertical direction.

FIG. 18B illustrates anchor_enhancement_information syntax 1830 of additional information including motion vector information according to another exemplary embodiment. For example, the anchor_enhancement_information syntax 1830 including motion information may be inserted into the above syntaxes, anchor_enhancement_information 620, 640, 820, 840, 1120, and 1140, illustrated in FIGS. 6A, 8 and 11. Referring to FIG. 18B, the anchor_enhancement_information 1830 further includes information related a reference index, as compared to the anchor_enhancement_information syntax 1800 illustrated in FIG. 18A.

If a current slice is a P type or a B type, the anchor_enhancement_information syntax 1830 may include ref_idx_10 1840 indicating a reference index of a previous slice of a P slice or a B slice. If the current slice has only one previous reference slice, the ref_idx_10 1840 may not be set.

If the current slice is a B type, the anchor_enhancement_information syntax 1830 may include ref_idx_11 1850 indicating a reference index of a slice subsequent to a B slice. If the current slice has only one subsequent reference slice, the ref_idx_11 1850 may not be set.

mvd_10 1860 and mvd_11 1870 of the anchor_enhancement_information syntax 1830 respectively have the same or similar characteristics as the mvd_10 1810 and the mvd_11 1820 of FIG. 18A.

Figure 19A:
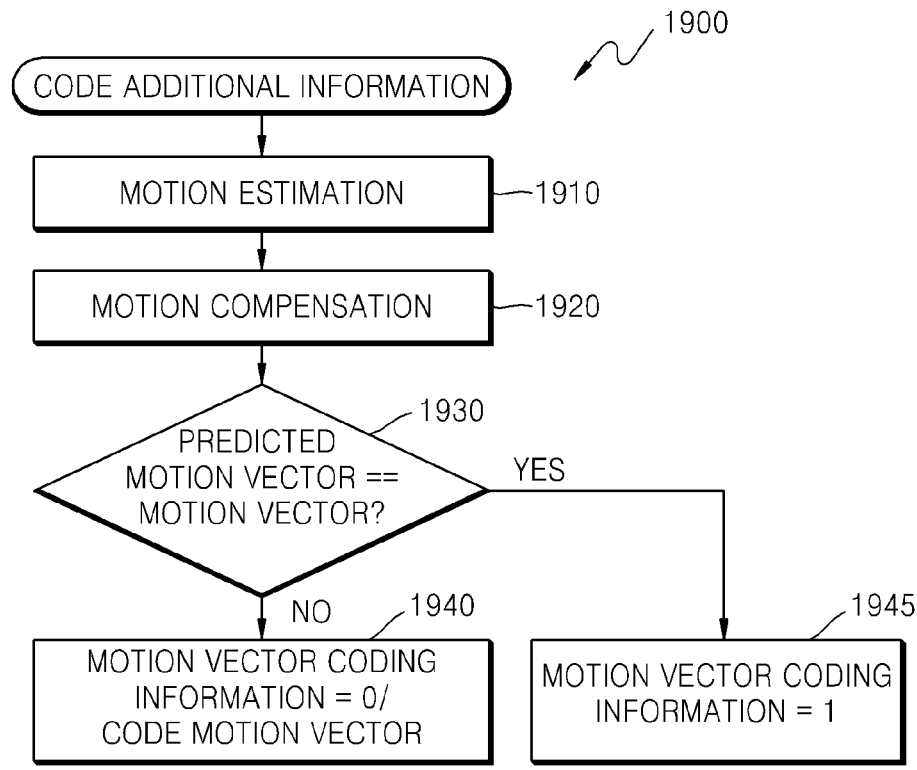
FIG. 19A is a flowchart illustrating a method of coding additional information including motion vector coding information, according to an exemplary embodiment.

FIG. 19A is a flowchart illustrating a method 1900 of coding additional information including motion vector coding information according to an exemplary embodiment. Operations of an additional information determination unit 130 and an additional information coding unit 140 of a multi-view video coding apparatus 100 according to an exemplary embodiment will be described in detail with reference to FIG. 19A. In the method 1900, the multi-view video coding apparatus 100 sets information indicating whether to code a motion vector as additional information of a current picture, and selectively determines and codes motion information.

Referring to FIG. 19A, the additional information determination unit 130 performs motion estimation on a current block in order to determine motion information of the current block and determines a motion vector of the current block (operation 1910). A reference picture used for motion estimation may be determined in various ways as in operation 1710 described above with reference to FIG. 17A. The additional information determination unit 130 performs motion compensation using the motion vector (operation 1920).

The additional information coding unit 140 compares a predicted motion vector with the motion vector determined in operation 1910 (operation 1930). If the predicted motion vector is the same as the motion vector, the predicted motion vector may be used instead of the motion vector, and thus the motion vector may not be coded. The additional information coding unit 140 may set the motion vector coding information to be "1" when the predicted motion vector is the same as the motion vector (operation 1945).

If the predicted motion vector is not the same as the motion vector, in order to code the motion vector, the additional information coding unit 140 may set the motion vector coding information to be "0" and codes the motion vector as the additional information (operation 1940). The motion vector may be coded as in operation 1730 described above with reference to FIG. 17A.

Figure 19B:
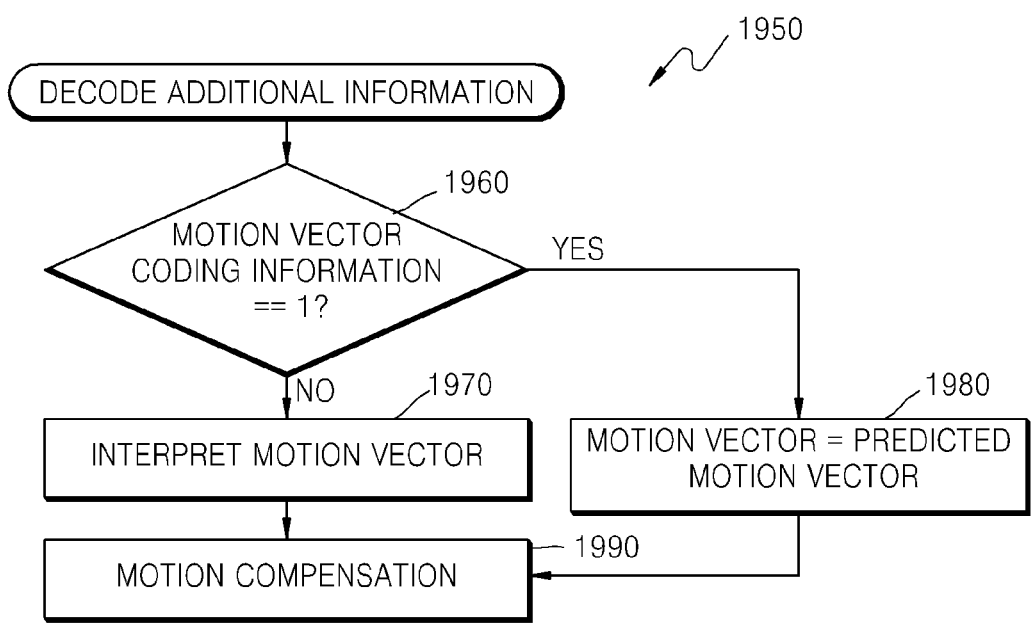
FIG. 19B is a flowchart illustrating a method of decoding additional information including motion vector coding information, according to an exemplary embodiment.

FIG. 19B is a flowchart illustrating a method 1950 of decoding additional information including motion vector coding information according to an exemplary embodiment. Operations of an additional information interpretation unit 230 and a reconstruction unit 240 of a multi-view video decoding apparatus 200 according to an exemplary embodiment will be described in detail with reference to FIG. 19B. Referring to FIG. 19B, the multi-view video decoding apparatus 200 interprets information indicating whether a motion vector is coded as additional information of a current picture, and selectively interprets motion information to reconstruct a current block and the current picture (operation 1950).

The additional information interpretation unit 230 interprets the motion vector coding information to determine whether a motion vector of the current block is coded (operation 1960). For example, motion vector coding information of "1" indicates that the motion vector is not coded, and motion vector coding information of "0" indicates that the motion vector is coded.

If the additional information interpretation unit 230 determines from the motion vector coding information that the motion vector of the current block is coded, the additional information interpretation unit 230 interprets the motion vector from the additional information (operation 1970). The motion vector of the current block may be determined by combining the interpreted motion information with a result of performing motion estimation. A reference picture used for motion estimation may be determined in various ways as described above with respect to operation 1750 described above with reference to FIG. 17B.

If it is determined in operation 1960 that the motion vector of the current block is not coded, based on the motion vector coding information, the additional information interpretation unit 230 uses a predicted motion vector as the motion vector of the current block (operation 1980). That is, the predicted motion vector based on a motion vector of a neighboring block of the current block is used as the motion vector of the current block.

The reconstruction unit 240 performs motion compensation on the current block by using the motion vector determined in operation 1970 or operation 1980 (operation 1990). The current block is reconstructed by performing motion compensation thereon and the other blocks are reconstructed in a similar way, thereby reconstructing the current picture.

FIG. 20A illustrates anchor_enhancement_information( ) syntax 2000 of additional information containing motion vector coding information according to an exemplary embodiment. For example, the anchor_enhancement_information syntax 2000 including motion information may be inserted into the syntaxes, anchor_enhancement_information 620, 640, 820, 840, 1120, and 1140, illustrated in FIGS. 6A, 8 and 11. Referring to FIG. 20A, the anchor_enhancement_information syntax 2000 may include use_predictor_as_mv_flag 2010 which is information indicating whether to code a motion vector. The 'anchor_enhancement_information' syntax 2000 may include mvd_l0 2020 indicating a motion vector of a previous slice when a motion vector of a current slice is coded and the current slice is a P type or a B type. Furthermore, the anchor_enhancement_information syntax 2000 may include mvd_l1 2030 indicating a motion vector of a subsequent slice when the motion vector of the current slice is coded and a current picture is a B type. The mvd_l0 2020 and the mvd_l1 2030 may respectively have the same or similar characteristics as the syntaxes, mvd_l0 1810 and 1860 and the syntaxes mvd_l1 1820 and 1870 described above with reference to FIGS. 18A and 18B.

FIG. 20B illustrates anchor_enhancement_information( ) syntax 2040 of additional information including motion vector coding information according to another exemplary embodiment. For example, the anchor_enhancement_information syntax 2040 including motion information may be inserted into the syntaxes, anchor_enhancement_information 620, 640, 820, 840, 1120, and 1140, illustrated in FIGS. 6A, 8, and 11. Referring to FIG. 20B, the anchor_enhancement_information syntax 2040 further includes information related to a reference index, as compared to the anchor_enhancement_information syntax 2000 of FIG. 20A.

The anchor_enhancement_information syntax 2040 may include use_predictor_as_mv_flag 2050 which is information indicating whether to code a motion vector. Furthermore, the anchor_enhancement_information syntax 2040 may include ref_idx_l0 2060 indicating a reference index of a previous slice of a P slice or a B slice when a motion vector of a current slice is coded and the current slice is the P type or the B type. If the current slice uses only one previous reference slice, the ref_idx_l0 2060 may not be set.

Moreover, the anchor_enhancement_information syntax 2040 may include ref_idx_l1 2070 indicating a reference index of a subsequent slice of a B slice when the current slice is a B type. If the current slice uses only one subsequent reference slice, the ref_idx_l1 2070 may not be set.

Characteristics of the mvd_l0 2080 and the mvd_l1 2090 of the anchor_enhancement_information syntax 2040 may be respectively the same as or similar to those of the mvd_l0 1810 and the mvd_l1 1820 described above with reference to FIG. 18A.

The multi-view video coding apparatus 100 and the multi-view video decoding apparatus 200 according to exemplary embodiments may use a combination of various types of the additional information described above with reference to FIGS. 12A through 20B and thus may perform a combination of prediction and compensation processes on a block or picture basis. That is, a combination of at least one of chrominance information, luminance information and information related to a motion vector may be used as the additional information, and a combination of at least one of chrominance compensation, luminance compensation, and motion estimation/compensation may be performed according to the additional information.

Figure 21:
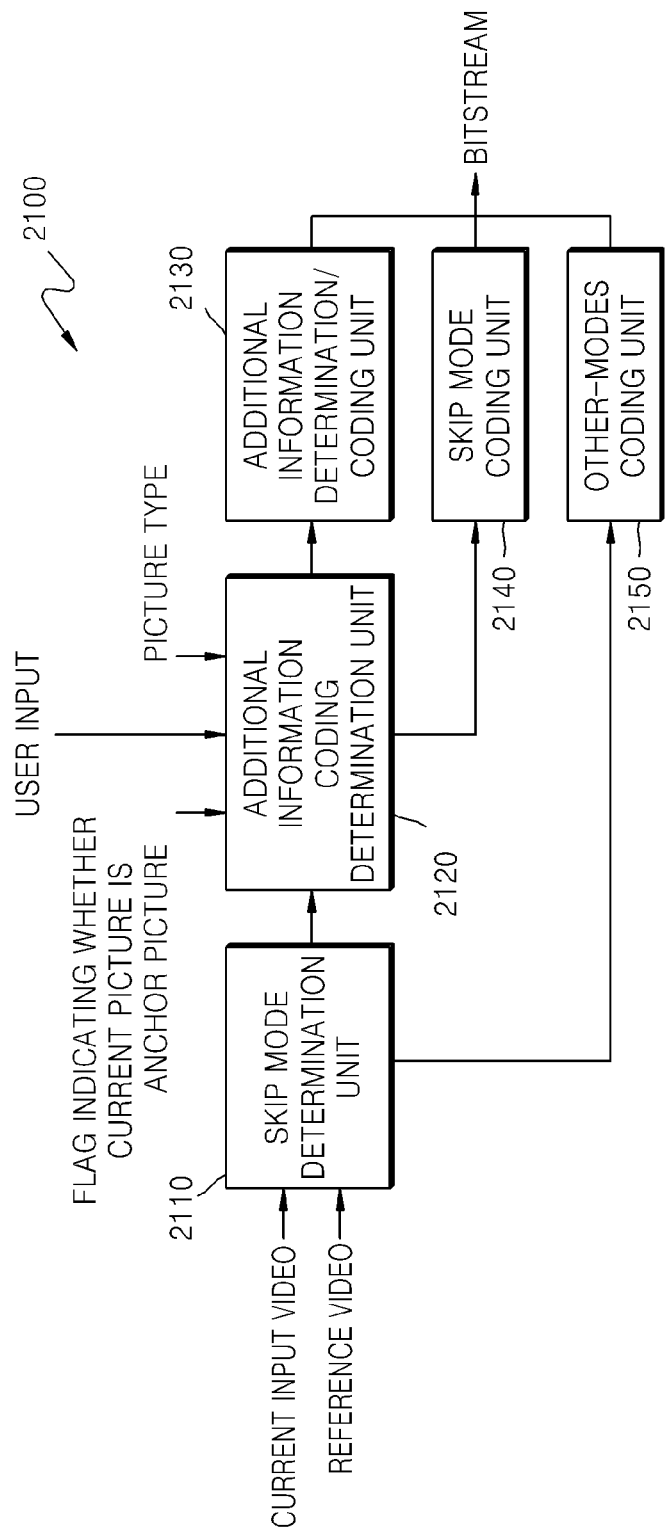
FIG. 21 is a block diagram of a multi-view video coding apparatus according to another exemplary embodiment.

FIG. 21 is a block diagram of a multi-view video coding apparatus 2100 according to another exemplary embodiment. Referring to FIG. 21, the multi-view video coding apparatus 2100 includes a skip mode determination unit 2110, an additional information coding determination unit 2120, an additional information determination/coding unit 2130, a skip mode coding unit 2140 and an other-modes coding unit 2150.

The skip mode determination unit 2110 receives a current input video and a reference video and determines a current block is in a skip mode according to at least one of various methods of determining a mode. If it is determined that the current block is in the skip mode, the additional information coding determination unit 2120 operates and if it is determined that the current block is not in the skip mode, the other-modes coding unit 2150 operates.

The additional information coding determination unit 2120 determines whether to code additional information regarding the current block in the skip mode in consideration of at least one of a flag indicating whether a current picture is an anchor picture, a user input, and a picture type. Here, whether the additional information is to be coded may be determined based on at least one of a block type, first and second picture types, and additional information coding information as described above with reference to FIGS. 4A through 11.

If the additional information coding determination unit 2120 determines the additional information to be coded, the additional information determination/coding unit 2130 operates. If the additional information coding determination unit 2120 determines the additional information not to be coded, the skip mode coding unit 2140 operates.

The additional information determination/coding unit 2130 codes additional information determined from at least one of determining chrominance information, performing chrominance compensation, determining luminance information, performing luminance compensation, determining motion information, and performing motion compensation, as described above with reference to FIGS. 12a through 20B. Furthermore, the additional information determination/coding unit 2130 inserts the added additional information into a bitstream that is to be transmitted.

If the additional information coding determination unit 2120 determines the additional information not to be coded, the skip mode coding unit 2140 codes the current block as suggested in a related art method that is performed in the skip mode and inserts the coding result into a bitstream that is to be transmitted.

The other-modes coding unit 2150 codes a block that is not in the skip mode, based on the type of the block, inserts the coding result in a bitstream, and outputs the bitstream.

Figure 22:
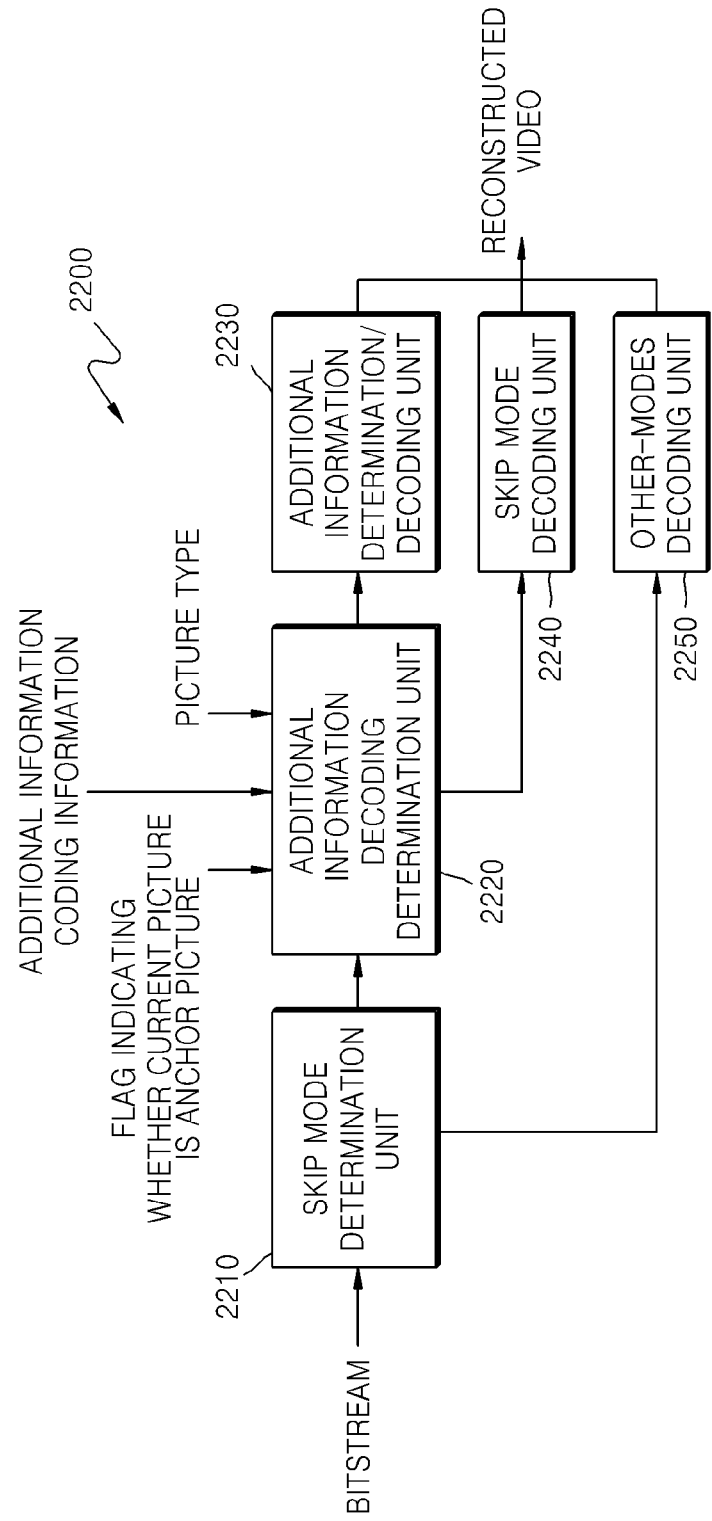
FIG. 22 is a block diagram of a multi-view video decoding apparatus according to another exemplary embodiment.

FIG. 22 is a block diagram of a multi-view video decoding apparatus 2200 according to another exemplary embodiment. Referring to FIG. 22, the multi-view video decoding apparatus 2200 includes a skip mode determination unit 2210, an additional information decoding determination unit 2220, an additional information determination/decoding unit 2230, a skip mode decoding unit 2240 and an other-modes decoding unit 2250.

The skip mode determination unit 2210 receives a bitstream and determines whether a current block is in a skip mode, based on information regarding the current block. If it is determined that the current block is in the skip mode, the additional information decoding determination unit 2220 operates. If it is determined that the current block is not in the skip mode, the other-modes decoding unit 2250 operates.

The additional information decoding determination unit 2220 determines whether to decode additional information of the current block in the skip mode, in consideration of at least one of a flag indicating whether a current picture is an anchor picture, additional information coding information, a picture type, etc. Here, whether to decode the additional information may be determined based on at least one of a block type, first and second picture types, and the additional information coding information as described above with reference to FIGS. 4A through 11.

If the additional information decoding determination unit 2220 determines the additional information to be decoded, the additional information determination/decoding unit 2230 operates. If the additional information decoding determination unit 2220 determines the additional information not to be decoded, the skip mode decoding unit 2240 operates.

The additional information determination/decoding unit 2230 interprets the additional information, constructs the current block by decoding the current block by performing at least one of chrominance information interpretation, chrominance compensation, luminance information interpretation, luminance compensation, motion information interpretation, and motion compensation, as described above with reference to FIGS. 12A through 20B, based on the additional information, and outputs the video of the constructed block.

If the additional information decoding determination unit 2220 determines the additional information not to be decoded, the skip mode decoding unit 2240 constructs the current block by performing a decoding operation, which is performed in the skip mode, on the current block, and outputs the video of the constructed block.

The other mode coding unit 2250 constructs the current block by performing a decoding operation on the current block that is not in the skip mode, based on the type of the current block, and outputs the video of the constructed block.

Figure 23:
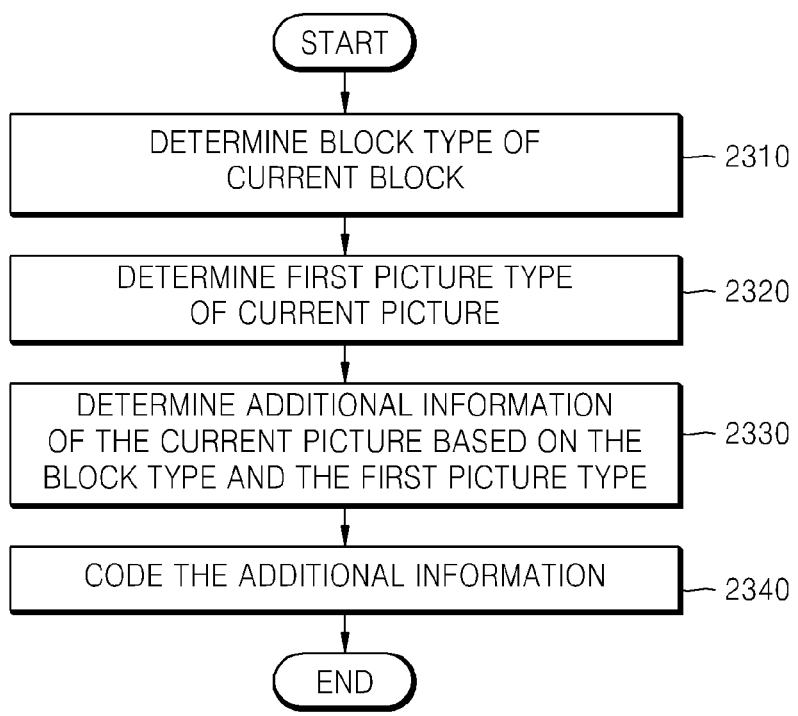
FIG. 23 is a flowchart illustrating a multi-view video coding method according to an exemplary embodiment.

FIG. 23 is a flowchart illustrating a multi-view video coding method according to an exemplary embodiment. Referring to FIG. 23, in operation 2310, a block type indicating a method of determining a motion vector of a current block present in a current picture of input video, is determined. The block type is categorized according to a method of determining a motion vector of a desired block. For example, the block type may be categorized into a skip mode, a direct mode, etc.

In operation 2320, a first picture type indicating whether the current picture is a reference picture type for inter prediction is determined. For example, the current picture may be categorized into an anchor picture type and a non-anchor picture type according to the first picture type. The anchor picture type is predicted by referring to only pictures from different viewpoints along the same time axis and is referred to when predicting other pictures from the same viewpoints at different points of time.

In operation 2330, additional information of the current picture is determined based on at least one of the block type of the current block and the first picture type of the current picture. According to an exemplary embodiment, the additional information may be set only when a skip mode block belongs to an anchor picture. The additional information may include at least one of chrominance information, luminance information, and motion information.

In operation 2340, the additional information of the current picture is coded. According to the additional information, at least one of chrominance compensation, luminance compensation, and motion compensation is performed, or the additional information may be coded. According to one or more exemplary embodiments, the additional information may be directly coded or may be coded by coding a difference between a value of the current block and a value predicted from neighboring blocks regarding at least one of chrominance compensation, luminance compensation, and compensation on the current block, thereby increasing coding efficiency. The additional information may be inserted into either a bitstream of multi-view video or an additional bitstream.

Figure 24:
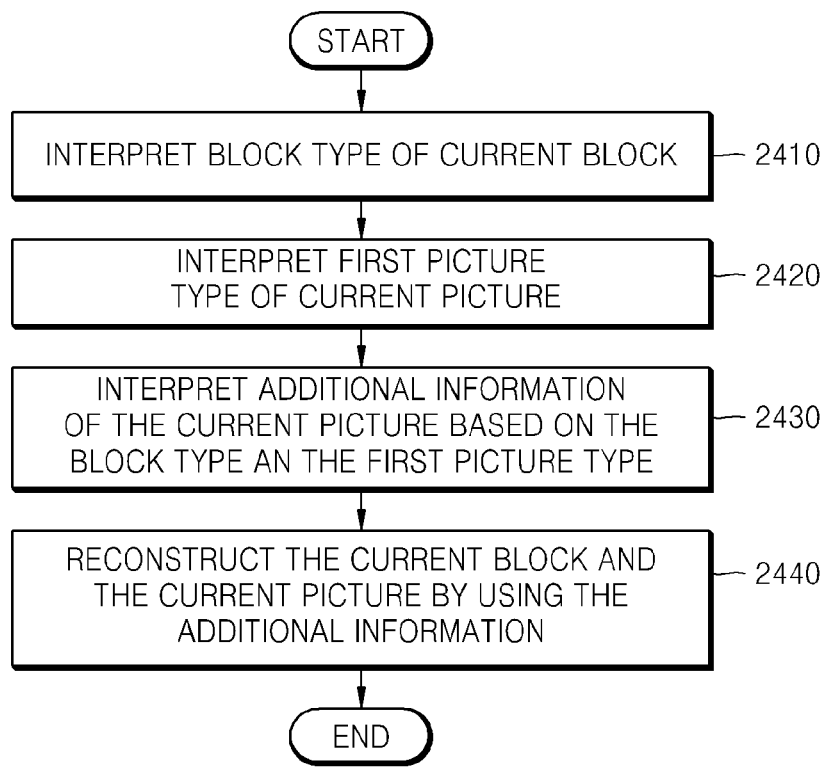
FIG. 24 is a flowchart illustrating a multi-view video decoding method according to an exemplary embodiment.

FIG. 24 is a flowchart illustrating a multi-view video decoding method according to an exemplary embodiment. Referring to FIG. 24, in operation 2410, a block type indicating a method of determining a motion vector of a current block present in a current picture included in a received bitstream, is interpreted. For example, whether the current block is in a skip mode may be determined by interpreting syntax contained in the bitstream, which indicates the block type of the current block.

In operation 2420, a first picture type indicating whether the current picture is a reference picture type for inter prediction is interpreted. For example, whether the current picture is an anchor picture may be determined by interpreting syntax of the bitstream, which indicates an I picture type of the current picture.

In operation 2430, additional information of the current picture is interpreted based on at least one of the block type of the current block and the first picture type of the current picture. For example, if a skip mode block belongs to an anchor picture, additional information of the current block or the current picture may be further interpreted from the syntax of the bitstream. The additional information may include at least one of chrominance information, luminance information, and motion information. If the additional information is transmitted as the difference between a value of the current block and a value predicted from neighboring blocks, regarding at least one of chrominance compensation, luminance compensation, and motion compensation, at least one of a chrominance compensation value, a luminance compensation value, and a motion vector thereof is reconstructed using a value predicted from neighboring blocks. In operation 2440, the current block and the current picture are reconstructed using the additional information of the current picture. The current block and picture may be constructed by performing at least one of chrominance compensation, luminance compensation, and motion compensation based on the additional information.

While not restricted thereto, one or more of the aforementioned exemplary embodiments may be embodied as a computer program that can be run by a general digital computer via a computer-readable recording medium. The computer-readable recording medium may be a magnetic recording medium (a ROM, a floppy disk, a hard disc, etc.), an optical recording medium (a CD-ROM, a DVD, etc.), etc. Furthermore, one or more of the exemplary embodiments may be embodied as a computer program that can be executed by a general digital computer via a carrier wave medium that transmits data via the Internet.

While aspects have been particularly shown and described with reference to exemplary embodiments, it will be understood by those of ordinary skill in the art that various changes in form and details may be made therein without departing from the spirit and scope of the inventive concept as defined by the appended claims.

The invention claimed is:

1. A method of decoding a multi-view video, the method comprising:
interpreting a block type indicating a method of determining a motion vector of a current block present in a current picture among multi-view pictures of the multi-view video, wherein the interpreting the block type comprises determining whether the current block is a skip mode block based on information regarding the block type;
interpreting a first picture type based on a result of the determination of whether the current block is the skip mode block, the first picture type indicating whether the current picture in which the current block is present is an anchor picture for inter prediction and inter-view prediction of other pictures among the multi-view pictures;
interpreting additional information of the current picture for improving image quality based on at least one of the interpreted first picture type and the interpreted block type; and
reconstructing the current block and the current picture by using the interpreted additional information,
wherein the interpreting the first picture type comprises:
interpreting the first picture type when the interpreted block type is a skip mode block type; and
not interpreting the first picture type when the interpreted block type is not the skip mode block type, and
wherein the interpreting of the additional information comprises:
determining whether to interpret the additional information, based on the interpreted first picture type; and
interpreting the additional information of the current picture when the current block present in the current picture is the skip mode block and when the interpreted first picture type indicates that the current picture in which the current block is present is the anchor picture for the inter prediction and the inter-view prediction,
wherein the additional information includes at least one of chrominance information of the current block, luminance information of the current block and information on a motion vector of the current block.

2. The method of claim 1, wherein reference pictures of the current picture are captured from different viewpoints along a same time axis, and each of the reference pictures captured from the plurality of viewpoints is used as a reference picture for inter predicting another picture from a same viewpoint.

3. A method of coding multi-view video, the method comprising:
determining a block type indicating a method of determining a motion vector of a current block present in a current picture among multi-view pictures of the multi-view video, wherein the determining the block type comprises determining whether the current block is a skip mode block based on information regarding the block type;
determining a first picture type based on a result of the determination of whether the current block is the skip mode block, the first picture type indicating whether the current picture in which the current block is present is an anchor picture for inter prediction and inter-view prediction of other pictures among the multi-view pictures;
determining additional information of the current picture for improving image quality based on at least one of the determined first picture type and the determined block type; and
coding the determined additional information of the current picture,
wherein the interpreting the first picture type comprises:
interpreting the first picture type when the interpreted block type is a skip mode block type; and
not interpreting the first picture type when the interpreted block type is not the skip mode block type, and
wherein the determining of the additional information comprises:
determining whether to determine the additional information, based on the determined first picture type; and
determining the additional information of the current picture when the current block present in the current picture is the skip mode block and when the determined first picture type indicates that the current picture in which the current block is present is the anchor picture for the inter prediction and the inter-view prediction,
wherein the additional information includes at least one of chrominance information of the current block, luminance information of the current block and information on a motion vector of the current block.

4. The method of claim 3, further comprising inserting the coded additional information into a bitstream comprising the multi-view video.

5. An apparatus for decoding multi-view video, the apparatus comprising:
a computer processor; and
a memory which stores instructions executable by the computer processor,
wherein the computer processor interprets a block type indicating a method of determining a motion vector of a current block present in a current picture among multi-view pictures of the multi-view video, interprets a first picture type indicating whether the current picture in which the current block is present is an anchor picture for inter prediction and inter-view prediction of other pictures among the multi-view pictures based on the interpreted block type, interprets additional information of the current picture for improving image quality based on at least one of the interpreted first picture type and the interpreted block type, and reconstructs the current block and the current picture by using the interpreted additional information,
wherein the computer processor determines whether the current block is a skip mode block based on information regarding the block type, interprets the first picture type based on a result of the determination of whether the current block is the skip mode block, determines whether to interpret the additional information, based on the interpreted first picture type and interprets the additional information of the current picture when the current block present in the current picture is a skip mode block and when the interpreted first picture type indicates that the current picture in which the current block is present is the anchor picture for the inter prediction and the inter-view prediction, and
wherein the computer processor interprets the first picture type when the interpreted block type is a skip mode block type and does not interpret the first picture type when the interpreted block type is not the skip mode block type,
wherein the additional information includes at least one of chrominance information of the current block, luminance information of the current block and information on a motion vector of the current block.

6. An apparatus for coding multi-view video, the apparatus comprising:
a computer processor; and
a memory which stores instructions executable by the computer processor,
wherein the computer processor determines a block type indicating a method of determining a motion vector of a current block present in a current picture among multi-view pictures of the multi-view video, determines a first picture type indicating whether the current picture in which the current block is present is an anchor picture for inter prediction and inter-view prediction of other pictures among multi-view pictures based on the determined block type, determines additional information of the current picture for improving image quality based on at least one of the determined first picture type and the determined block type, and codes the determined additional information of the current picture,
wherein the computer processor determines whether the current block is a skip mode block based on information regarding the block type, determines the first picture type based on a result of the determination of whether the current block is the skip mode block, determines whether to determine the additional information, based on the determined first picture type and determines the additional information of the current picture upon determining that the current block present in the current picture is a skip mode block and when the determined first picture type indicates that the current picture in which the current block is present is the anchor picture for the inter prediction and the inter-view prediction, and
wherein the computer processor interprets the first picture type when the interpreted block type is a skip mode block type and does not interpret the first picture type when the interpreted block type is not the skip mode block type,
wherein the additional information includes at least one of chrominance information of the current block, luminance information of the current block and information on a motion vector of the current block.

7. A non-transitory computer readable medium having recorded thereon a computer program for executing a method of coding multi-view video, the method comprising:
determining a block type indicating a method of determining a motion vector of a current block present in a current picture among multi-view pictures of the multi-view video, wherein the determining of the block type comprises determining whether the current block is a skip mode block based on information regarding the block type;
determining a first picture type based on a result of the determination of whether the current block is the skip mode block, the first picture type indicating whether the current picture in which the current block is present is an anchor picture for inter prediction and inter-view prediction of other pictures among the multi-view pictures;
determining additional information of the current picture for improving image quality based on at least one of the determined first picture type and the determined block type; and
coding the determined additional information of the current picture,
wherein the interpreting the first picture type comprises:
interpreting the first picture type when the interpreted block type is a skip mode block type; and
not interpreting the first picture type when the interpreted block type is not the skip mode block type, and
wherein the determining of the additional information comprises:
determining whether to determine the additional information based on the determined first picture type; and
determining the additional information of the current picture when the current block present in the current picture is a skip mode block and when the determined first picture type indicates that the current picture in which the current block is present is the anchor picture for the inter prediction and the inter-view prediction,
wherein the additional information includes at least one of chrominance information of the current block, luminance information of the current block and information on a motion vector of the current block.

* * * * *